US012803262B2

(12) United States Patent
Bodington et al.

(10) Patent No.: US 12,803,262 B2
(45) Date of Patent: Nov. 17, 2026

(54) JUNCTION BOXES HAVING CABLE SPLICE ASSEMBLIES FOR DOWNHOLE PUMPS USED IN OIL OR GAS PRODUCTION WELLS

(71) Applicants: Christian Bodington, Tulsa, OK (US); Luis Seczon, Fulshear, TX (US); Todd Parnian, Tulsa, OK (US)

(72) Inventors: Christian Bodington, Tulsa, OK (US); Luis Seczon, Fulshear, TX (US); Todd Parnian, Tulsa, OK (US)

(73) Assignee: Oilfield Equipment Development Center Limited, Victoria (SC)

( * ) Notice: Subject to any disclaimer, the term of this patent is extended or adjusted under 35 U.S.C. 154(b) by 340 days.

(21) Appl. No.: 18/578,060

(22) PCT Filed: May 26, 2022

(86) PCT No.: PCT/US2022/031226
§ 371 (c)(1),
(2) Date: Jan. 10, 2024

(87) PCT Pub. No.: WO2022/251560
PCT Pub. Date: Dec. 1, 2022

(65) Prior Publication Data
US 2024/0364091 A1 Oct. 31, 2024

Related U.S. Application Data

(60) Provisional application No. 63/193,597, filed on May 26, 2021.

(51) Int. Cl.
*H02G 15/115* (2006.01)

(52) U.S. Cl.
CPC .................................. *H02G 15/115* (2013.01)

(58) Field of Classification Search
CPC ........................... H02G 15/115; H02G 13/625
(Continued)

(56) References Cited

U.S. PATENT DOCUMENTS 4,684,764 A * 8/1987 Luzzi ................... H02G 15/115 174/91
7,906,957 B2 * 3/2011 Tarchinski ............. H01R 24/28 324/149
(Continued)

FOREIGN PATENT DOCUMENTS

JP H07241023 A 12/1995

OTHER PUBLICATIONS

Solarenergie • Blitz- und Uberspannungsschutz fur Photovoltaikanlagen. PV-C3M-S 2,5-6 (-)—Photovoltaic connector.

*Primary Examiner* — Gary F Paumen
(74) *Attorney, Agent, or Firm* — Douglas H. Elliott; Nathan Q. Huynh; My Idea Law PLLC

(57) ABSTRACT

The disclosure herein includes cable splice assemblies and methods for splicing a first electrical cable terminal, at least partially disposed in a junction box, to a second electrical cable terminal that may each include a cable splice assemblies which may include: a first housing coupled to the junction box and to a portion of the first electrical cable terminal, wherein the first housing may include a first wall; and a second housing that may be coupled to the first housing and to a portion of the second electrical cable terminal, wherein the first housing may include a second wall; and a port may be disposed in the first wall or the second wall; a pin that may have a portion disposed in the port, wherein the pin may be conductively coupled to the first terminal or the second terminal.

20 Claims, 14 Drawing Sheets

(58) Field of Classification Search
USPC .......................................... 439/345, 314, 311
See application file for complete search history.

(56) References Cited

U.S. PATENT DOCUMENTS

| | | | | |
|---|---|---|---|---|
| 10,431,930 | B1 * | 10/2019 | Pearman | H02G 15/113 |
| 10,601,168 | B2 * | 3/2020 | Onodi | H01R 13/684 |
| 10,770,832 | B2 * | 9/2020 | Franke | H02G 15/113 |
| 2010/0123455 | A1 * | 5/2010 | Tarchinski | H01R 13/6273<br>439/732 |
| 2014/0127926 | A1 * | 5/2014 | Condo | H01R 13/6456<br>439/345 |
| 2014/0273586 | A1 * | 9/2014 | Sandwith | H01R 13/53<br>439/725 |
| 2015/0044896 | A1 * | 2/2015 | Davies | H01R 13/639<br>29/857 |
| 2018/0248306 | A1 * | 8/2018 | Franke | H02G 15/117 |

* cited by examiner

JUNCTION BOXES HAVING CABLE SPLICE ASSEMBLIES FOR DOWNHOLE PUMPS USED IN OIL OR GAS PRODUCTION WELLS

CROSS REFERENCE TO RELATED APPLICATIONS

This application claims benefit to U.S. Provisional Application No. 63/193,597, filed on May 26, 2021; and this application hereby incorporates herein U.S. Provisional Application 63/193,597 as if set forth herein in its entirety.

BACKGROUND

1. Field of Inventions

The field of this application and any resulting patent is cable splice assemblies for junction boxes used in oil and gas operations.

2. Description of Related Art

Various cable splice assemblies and methods for splicing electrical cables have been proposed and utilized, including some of the methods and structures disclosed in some of the references appearing on the face of this application or issued patent. However, those systems and methods lack the combination of steps and/or features of the systems and methods claimed herein. Furthermore, it is contemplated that the systems and/or methods disclosed herein, including those claimed, solve at least some of the problems those prior art systems and methods have failed to solve. Also, it is contemplated that the systems and/or methods claimed herein have benefits that would be surprising and unexpected to a hypothetical person of ordinary skill with knowledge of the prior art existing as of the filing date of this application.

SUMMARY

The disclosure herein includes apparatuses that include cable splice assemblies, and also includes junction boxes to which one or more cable splice assemblies are coupled, and which junction boxes and cable splice assemblies preferably receive electrical cables that extend upward from a downhole pump in an oil or gas or water well to the junction box. Preferably the apparatus includes at least three such cable splice assemblies, and each apparatus may include one or more of the following: a cable splice assembly for splicing a first electrical cable terminal, that is at least partially disposed in a junction box, to a second electrical cable terminal, the cable splice assembly may include: a first housing coupled to the junction box and to a portion of the first electrical cable terminal, wherein the first housing may include a first wall; and a second housing coupled to the first housing and to a portion of the second electrical cable terminal, wherein the first housing may include a second wall; and a port disposed in the first wall or the second wall; a pin disposed in the port, wherein the pin may be conductively coupled to the first terminal or the second terminal.

Additionally, the disclosure herein includes cable splice assemblies and methods for splicing a first electrical cable terminal, at least partially disposed in a junction box, to a second electrical cable terminal that may each include a cable splice assemblies which may include: a first housing coupled to the junction box and to a portion of the first electrical cable terminal, wherein the housing may include a wall having a port extending through the wall; and a second housing coupled to the first housing and to a portion of the second electrical cable terminal; a plug having a portion disposed in the port; and a pin having a portion extending out of the plug, wherein the pin may be conductively coupled to the first terminal Also, the disclosure herein includes cable splice assemblies and methods for splicing a first electrical cable terminal, at least partially disposed in a junction box, to a second electrical cable terminal that may each include a cable splice assemblies which may include: a housing capable of being coupled to the junction box and to a portion of the first electrical cable terminal, wherein the housing may include a wall having a port extending through the wall; and a second housing capable of being coupled to the first housing and to a portion of the second electrical cable terminal; a plug having a portion disposed in the port; and a pin capable of having a portion disposed in the port, wherein the pin is capable being conductively coupled to the first terminal.

Further, the disclosure herein includes cable splice assemblies and methods for splicing a first electrical cable terminal, at least partially disposed in a junction box, to a second electrical cable terminal that may each include a cable splice assemblies which may include: a housing capable of receiving therein a portion of the first electrical cable terminal, wherein the housing may include a wall having a port extending through the wall; and a pin capable of having a portion disposed in the port, wherein the pin is capable of being conductively coupled to the first terminal.

In addition, the disclosure herein includes cable splice assemblies and methods for splicing a first electrical cable terminal, at least partially disposed in a junction box, to a second electrical cable terminal that may each include a cable splice assemblies which may include: a first housing capable of receiving therein a portion of the first electrical cable terminal, wherein the first housing may include a port extending therethrough; a second housing capable of receiving therein a portion of the second electrical cable terminal and capable of being coupled to the first housing; and a pin capable of having a portion disposed in the port, wherein the pin is capable of being conductively coupled to the first terminal.

Moreover, the disclosure herein includes cable splice assemblies and methods for splicing a first electrical cable terminal, at least partially disposed in a junction box, to a second electrical cable terminal that may each include a cable splice assemblies which may include: a first housing capable of receiving therein a portion of the first electrical cable terminal; a second housing capable of receiving therein a portion of the second electrical cable terminal and capable of being coupled to the first housing; a plug that may be removably coupled to the first housing; and a pin having a portion that may extend through the plug and the first housing.

Furthermore, the disclosure herein includes cable splice assemblies and methods for splicing a first electrical cable terminal, at least partially disposed in a junction box, to a second electrical cable terminal that may each include a cable splice assemblies which may include: a first housing that may have a portion of the first electrical cable terminal disposed therein, wherein the first housing may include a port extending therethrough; a second housing coupled to the first housing and having a portion of the second electrical cable terminal disposed therein; a plug that may be disposed in the port; and a pin that may have a portion extending through the plug and the port, wherein the pin may be conductively coupled to the first terminal.

The disclosure herein includes cable splice assemblies and methods for splicing a first electrical cable terminal, at least partially disposed in a junction box, to a second electrical cable terminal that may each include a cable splice assemblies which may include: a first housing that may include: a first terminal end for receiving therein a portion of the first electrical cable terminal; and a first locking aperture; and a second housing that may include: a second terminal end for receiving therein a portion of the second electrical cable terminal; and a second locking aperture, wherein the second locking aperture may be capable of being aligned with the first locking aperture to receive a portion of a lock therethrough.

The disclosure herein includes cable splice assemblies and methods for splicing a first electrical cable terminal, at least partially disposed in a junction box, to a second electrical cable terminal that may each include a cable splice assemblies which may include: a lock; a first housing that comprises: a first terminal end that may have a portion of the first electrical cable terminal disposed therein; and a first locking aperture; and a second housing that may include: a second terminal end that may have a portion of the second electrical cable terminal disposed therein; and a second locking aperture that may be aligned with the first locking aperture, wherein a portion of the lock may extend through the first locking aperture and the second locking aperture.

The disclosure herein includes cable splice assemblies and methods for splicing a first electrical cable terminal, at least partially disposed in a junction box, to a second electrical cable terminal that may each include a cable splice assemblies which may include: 1) a first housing for coupling, coupled to, or that is capable of being coupled to a junction box, wherein the first housing may have: a) a first housing end; and b) a first terminal end for receiving therein a portion of a first electrical cable terminal; 2) a second housing that may have: a) a second housing end for coupling, coupled to, or that is capable of being coupled to the first housing end; and b) a second terminal end for receiving therein a portion of a second electrical cable terminal; 3) a first connector the first electrical cable terminal preferably while disposed fully or partially in the first housing; 4) a second connector for coupling, coupled to, or that is capable of being coupled to the second electrical cable terminal preferably while disposed fully or partially in the second housing and for coupling to the first connector; 5) a first seal that may be disposed in the first housing, preferably for sealable coupling to the first electrical cable terminal; 6) a second seal that may be disposed in the second housing for sealable coupling to the second electrical cable terminal; 7) a first cap that presses or is capable of pressing the first seal against the first terminal end; and 8) a second cap that presses or is capable of pressing the second seal against the second terminal end.

The disclosure herein includes cable splice assemblies and methods for splicing a first electrical cable terminal, at least partially disposed in a junction box, to a second electrical cable terminal that may each include a cable splice assemblies which may include: 1) a first housing for coupling, coupled to, or that is capable of being coupled to a junction box, wherein the first housing may have: a) a first housing end; and a first terminal end for receiving therein a portion of the first electrical cable terminal; 2) a second housing that may have: a) a second housing end for coupling, coupled to, or that is capable of being coupled to the first housing end; and b) a second terminal end for receiving therein a portion of the second electrical cable terminal; 2) a first connector for coupling, coupled to, or that is capable of being coupled to the first electrical cable terminal while disposed in the first housing; 3) a second connector for coupling, coupled to, or that is capable of being coupled to the second electrical cable terminal while disposed in the second housing and for coupling, coupled to, or that is capable of being coupled to the first connector; 4) a first cap for covering the first terminal end; and 5) a second cap for covering the second terminal end.

The disclosure herein includes cable splice assemblies and methods for splicing a first electrical cable terminal, at least partially disposed in a junction box, to a second electrical cable terminal that may each include a cable splice assemblies which may include: 1) a first housing for coupling, coupled to, or that is capable of being coupled to a junction box, wherein the first housing may have: a) a first housing end; and a) a first terminal end for receiving therein a portion of the first electrical cable terminal; and b) a port extending through a portion of the first housing; 2) a second housing that may have: a) a second housing end for coupling, coupled to, or that is capable of being coupled to the first housing end; and b) a second terminal end for receiving therein a portion of the second electrical cable terminal; 3) a first connector for coupling, coupled to, or that is capable of being coupled to the first electrical cable terminal while disposed in the first housing, wherein the first connector may be accessible through the port; 4) a second connector for coupling, coupled to, or that is capable of being coupled to the second electrical cable terminal while disposed in the second housing and for coupling to the first connector; 5) a plug having plug portion capable of extending through the port into physical contact with the first connector; 6) a first cap for covering the first terminal end; and 7) a second cap for covering the second terminal end.

The disclosure herein includes cable splice assemblies and methods for splicing a first electrical cable terminal, at least partially disposed in a junction box, to a second electrical cable terminal that may each include a cable splice assemblies which may include: 1) a lock; 2) a first housing for coupling to the junction box, wherein the first housing may have: a) a first terminal end for receiving therein a portion of the first electrical cable terminal; and b) a first locking aperture; 3) a second housing that may have: a) a second terminal end for receiving therein a portion of the second electrical cable terminal; and b) a second locking aperture, wherein the second locking aperture may be capable of being aligned with the first locking aperture to receive a portion of the lock therethrough; 4) a first cap for covering the first terminal end; and 5) a second cap for covering the second terminal end.

The disclosure herein includes methods for splicing a first electrical cable terminal and a second electrical cable terminal to a junction box, which methods may each include one or more of the following steps: 1) providing a cable splice assembly that may include: a) a first housing having: i) a first housing end; and ii) a first terminal end; b) a second housing having: i) a second housing end; and ii) a second terminal end; c) a first connector; d) a second connector; e) a first seal; f) a second seal; g) a first cap; and h) a second cap; 2) extending the first electrical terminal through the first cap and the first seal into the first terminal end; 3) coupling the first connector to the first electrical cable terminal in the first housing; 4) sealably coupling the first cap with the first terminal end; 5) extending the second electrical terminal through the second cap and the second seal into the second terminal end; 6) coupling the second connector to the second electrical cable terminal end in the second housing; 7) sealably coupling the second cap with the second terminal end; 8) coupling the first connector to the second connector, wherein the first connector and the second connector may be capable of electrical communication; 9) coupling the first housing end to the second housing end, wherein the first connector and the second connector may be insulated; and 10) coupling the first housing to the junction box.

The disclosure herein includes methods for splicing a first electrical cable terminal and a second electrical cable terminal on a junction box, which methods may each include: 1) providing a cable splice assembly that may include: a first housing having: i) a first housing end; and ii) a first terminal end for receiving the first electrical cable terminal; a second housing having: i) a second housing end; and ii) a second terminal end for receiving the second electrical cable terminal; c) a first connector; and d) a second connector; 2) coupling the first connector to the first electrical cable terminal in the first housing; 3) coupling the second connector to the second electrical cable terminal end in the second housing; 4) coupling the first connector to the second connector, wherein the first connector and the second connector may be capable of electrical communication; 5) coupling the first housing end to the second housing end; and 6) coupling the first housing to the junction box.

The disclosure herein includes methods for splicing a first electrical cable terminal and a second electrical cable terminal on a junction box, which methods may each include: 1) providing a cable splice assembly that may include: a first housing that may have: i) a first housing end; and ii) a first terminal end for receiving the first electrical cable terminal; and iii) a port extending through a portion of the first housing; b) a second housing that may have: i) a second housing end; and ii) a second terminal end for receiving the second electrical cable terminal; c) a first connector; d) a second connector; and e) a plug having a plug portion; 2) coupling the first connector to the first electrical cable terminal in the first housing; 3) coupling the second connector to the second electrical cable terminal end in the second housing; 4) coupling the first connector to the second connector; 5) coupling the first housing end to the second housing end; 6) extending the plug portion through the port; 7) abutting the plug portion against the first connector; and 8) coupling the first housing to the junction box.

The disclosure herein includes methods for splicing a first electrical cable terminal and a second electrical cable terminal on a junction box, which methods may each include: 1) providing a cable splice assembly that may include: a) a first housing having: i) a first terminal end for receiving the first electrical cable terminal; and ii) a first locking aperture; a second housing having: a second terminal end for receiving the second electrical cable terminal; and iii) a second locking aperture; b) a first connector; c) a second connector; and d) a lock; 2) coupling the first connector to the first electrical cable terminal in the first housing; 3) coupling the second connector to the second electrical cable terminal end in the second housing; 4) coupling the first connector to the second connector; 5) coupling the first housing to the second housing; 6) aligning the first locking aperture with the second locking aperture; extending a portion of the lock through the first locking aperture and the second locking aperture; and 7) coupling the first housing to the junction box.

The disclosure herein includes methods for splicing a first electrical cable terminal and a second electrical cable terminal on a junction box, which methods may each include: providing a cable splice assembly that may include: a first housing; a second housing; a port that may be disposed in either first housing or the second housing; a plug that may cover the port; and a pin; coupling either the first housing or the second a junction box; sealably coupling the first housing to the second housing; sealably coupling the first cable terminal to the first housing; sealably coupling the second cable terminal to the second housing; removing the plug from the port; extending a portion of the pin through the port; abutting the pin against either the first electrical cable terminal or the second electrical cable terminal.

DETAILED DESCRIPTION

1. Introduction

Figure 1:
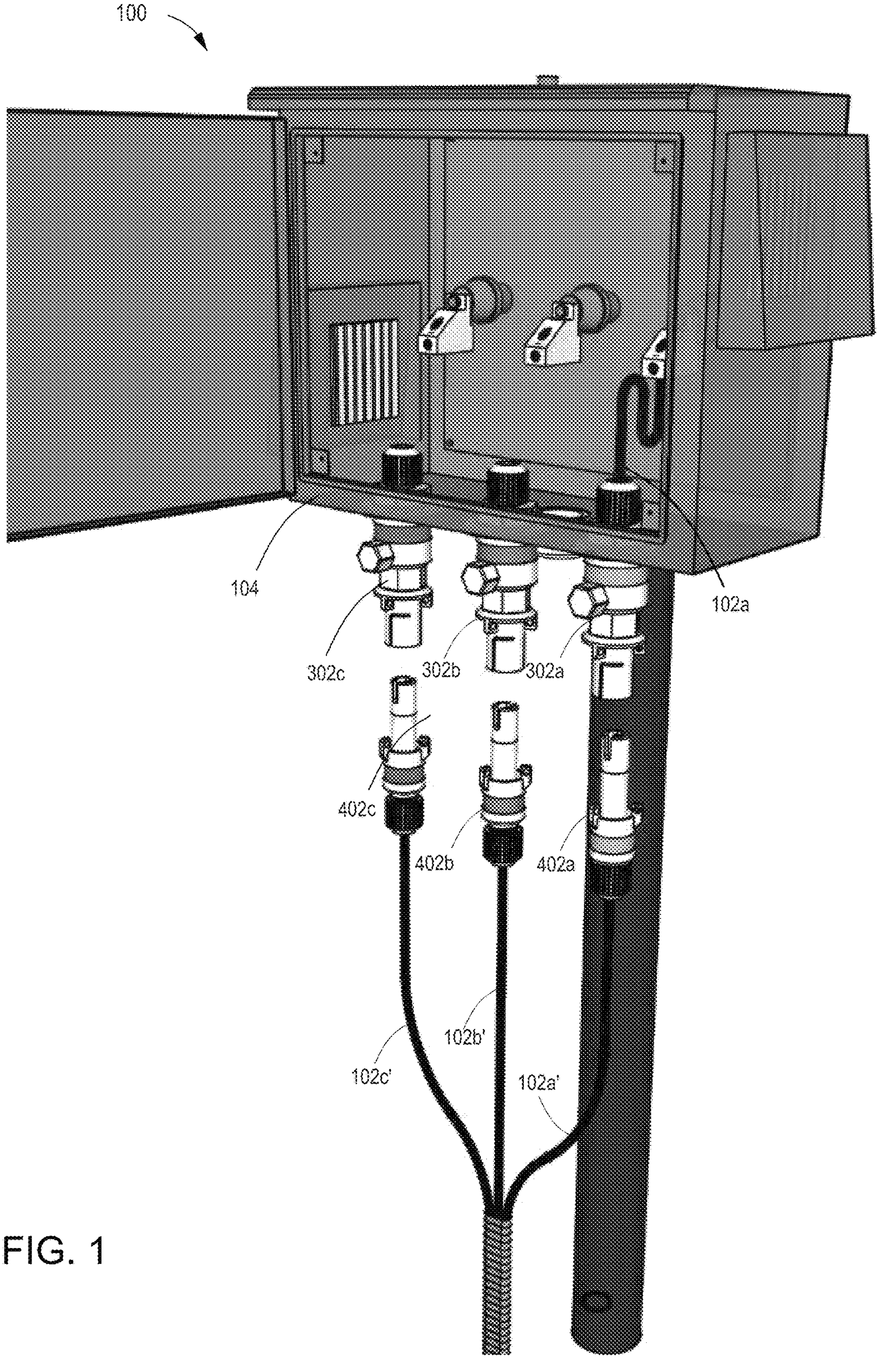
FIG. 1 illustrates a perspective view of a junction box assembly.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims include one or more of the following terms which, as used herein, are expressly defined below.

The term "aligning" as used herein is a verb that means manufacturing, forming, adjusting, or arranging one or more physical objects into a particular position. After any aligning takes place, the objects may be fully or partially "aligned." Aligning preferably involves arranging a structure or surface of a structure in linear relation to another structure or surface; for example, such that their borders or perimeters may share a set of parallel tangential lines. In certain instances, the aligned borders or perimeters may share a similar profile. Additionally, apertures may be aligned, such that a structure or portion of a structure may extend into and/or through the apertures.

The term "aperture" as used herein is defined as any opening in a solid object or structure, e.g., housing, sleeve, seal, cap, or tubular. For example, an aperture may be an opening that begins on one side of a solid object, e.g., housing, sleeve, seal, cap, or tubular, and ends on the other side of the object. An aperture may alternatively be an opening that does not pass entirely through an object, but only partially passes through, e.g., as a groove. An aperture can be an opening in an object, e.g., housing, sleeve, seal, cap, or tubular, that is completely circumscribed, defined, or delimited by the object itself. Alternatively, an aperture can be an opening in the object, e.g., housing, sleeve, seal, cap, or tubular, when the object is combined with one or more other objects or structures. An aperture may receive an object, e.g., fingers, sleeve, seal, cap, and permit ingress and/or egress of the object through the aperture. For example, a seal may be received in an aperture of a housing or a sleeve. Additionally, a portion of an electrical cable may be received in an aperture of a housing, a sleeve, a seal, and/or a cap. A surface defining an aperture may have a shoulder extending radially therefrom, e.g., inwardly or outwardly.

The term "assembly" as used herein is defined as any set of components that have been fully or partially assembled together. A group of assemblies may be coupled to form a solid body having an inner surface and an outer surface.

The term "cap" as used herein is defined as a structure capable of being removably coupled to a sleeve or a housing. A cap may be constructed from high-dielectric material, e.g., plastic, polyamide, polyvinyl chloride (PVC), polyvinylidene fluoride or polyvinylidene difluoride (PVDF). A cap may be constructed from metal, e.g., aluminum, titanium, brass, stainless steel, and copper. A cap may have pin threads, e.g., male threads, capable of being coupled with box threads, e.g., female threads, of a sleeve and/or a housing. A cap may have box threads, e.g., female threads, capable of being coupled with pin threads, e.g., male threads, of a sleeve and/or a housing. A cap may have a lip that is radiused. A cap may have a lip that is tapered. A cap may have a lip having a frusto-conical surface. A cap may have a lip that may be slidably abutted against fingers of a housing or a sleeve. A cap may have a lip capable of receiving a portion of an electrical cable, e.g., terminal, therethrough. A cap may have an aperture through which a portion, e.g., terminal, of an electrical cable may extend. A seal may be disposed within an aperture of a lip of a cap, in which the seal and the lip are concentric (see, e.g., FIG. 9).

The term "castellation" as used herein is defined as having a protrusion configured, sized, and/or shaped to be abutted against and/or aligned with a portion, e.g., castellation, of another structure or object. A first "castellation wall" may have a protrusion configured, sized, and/or shaped to receive a protrusion of second castellation wall. A castellation wall may have an aperture disposed therein. A castellation wall may have two protrusions that form a groove therebetween. Two castellation walls may be meshed, such that a protrusion of one castellation wall may disposed in a groove of the other castellation wall. Two castellation walls may have corresponding apertures capable of being aligned with each other, e.g., for a portion of a lock to extend through.

The term "connector" as used herein is defined as any structure capable of conducting electricity cable. A connector may be cylindrical. A connector may receive an electrical cable. A connector may be constructed from metal, e.g., aluminum, titanium, brass, stainless steel, and copper. A connector may conduct electricity. A connector may have an aperture disposed perpendicular to a central axis of the connector. A connector may have an aperture disposed parallel to a central axis of the connector. A connector may have a first aperture and a second aperture that intersect each other. A connector may have a pin. A connector may have box for receiving a pin of another connector.

The term "coupled" as used herein is defined as directly or indirectly connected, attached, or unitary, e.g., part of. A first object may be coupled to a second object such that the first object is positioned at a specific location and orientation with respect to the second object. For example, a housing may be coupled to sleeve or cap. A first object may be either permanently, removably, slidably, threadably, conductively, and/or sealably coupled to a second object. Two objects may be "removably coupled" to each other via threads, tape, latches, hooks, fasteners, locks, male and female connectors, clips, and/or clamps. For instance, a first housing and a second housing may be removably coupled to each other such that the first housing may then be uncoupled and removed from the second housing. In addition, a housing cap may be coupled to a housing such that the housing cap and the housing may then be uncoupled. Also, two objects may be capable of being "slidably coupled," e.g., where an inner aperture of one object is capable of receiving a second object. Thus, a housing, a sleeve, a seal, and/or a cap having apertures disposed therethrough may receive a portion, e.g., terminal, of an electrical cable. Additionally, two objects may be capable of being "threadably coupled," e.g., where a threaded outer surface of one object is capable of engaging with or to a threaded inner surface of another object. Threadably coupled objects may be removably coupled.

Accordingly, a housing may be threadably coupled to a sleeve where a threaded inner surface, e.g., box threads or female threads, of the housing may be engaged with a threaded outer surface, e.g., pin threads or male threads, of the sleeve. Also, a housing may be threadably coupled to a cap where a threaded inner surface, e.g., box threads or female threads, of the cap may be engaged with a threaded outer surface, e.g., pin threads or male threads, of the housing. Two objects may be "conductively coupled," where electricity may be conducted from one object to the other. For example, a first connector may be conductively coupled to a second connector because an electricity may be conducted from the first connector to the second connector. Moreover, two objects may be capable of being "sealably coupled," e.g., where portions of the surfaces of the objects are capable of being abutted against each other so as to inhibit passage of fluid, gas, and/or particles between the portions of the surfaces. For example, a seal may be pressed or biased, e.g., by fingers, inward towards a central axis such that an inner surface of the seal may be abutted against and outer surface of an electric cable. Additionally, a seal may be pressed or biased inward, e.g., by fingers, to cause the seal to be deformed around an electric cable such that the inner surface of the seal may abutted against the outer surface of an electric cable. A seal that is sealably coupled to an electrical cable may inhibit passage of fluid, gas, and/or particles between the seal and the electrical cable.

The term "cylindrical" as used herein is defined as shaped like a cylinder, e.g., having straight parallel sides and a circular or oval or elliptical cross-section. A cylindrical body or structure, e.g., housing, sleeve, seal, cap, or electrical cable, may be completely or partially shaped like a cylinder. A cylindrical body, e.g., housing, sleeve, seal, cap, or electrical cable, that has an inner or outer diameter that changes abruptly may have a lip, e.g., radial face, rim, or collar (see, e.g., 402, FIGS. 2-4). A lip may extend toward or away from the center axis of a cylinder. A cylindrical object may have a lip extending toward or away from the central axis line of the object. A cylindrical object may have a lip disposed on an inner surface. A cylindrical object may have a lip disposed on an outer surface. Additionally, a cylindrical body, e.g., housing, sleeve, seal, cap, or electrical cable, may have a lip that is tapered or radiused. A cylindrical body may have an aperture extending through the entire length of the body to form a hollow cylinder that is capable of permitting another body, e.g., housing, sleeve, seal, or cap, to extend or pass through.

The term "epoxy" as used herein is defined as a material capable of sealing surfaces of two objects, e.g., housing, seal, sleeve, cap, connector, and electrical cable. An epoxy may be coupled to a housing, a seal, a sleeve, a cap, a connector, and an electrical cable. A technician may couple or cover a component, e.g., housing, seal, sleeve, cap, connector, and/or electrical cable, with epoxy when assembling the component with a portion of a cable splice assembly. An epoxy may be adhesive, plastic, paint, or resin. An epoxy may be material made from thermosetting polymers containing epoxide groups. In any one of structures disclosed, e.g., FIGS. 4-10, an epoxy may be used to create a seal. Such epoxy may be introduced during manufacturing in liquid or semi-liquid form and cured at ambient conditions.

The terms "first" and "second" as used herein merely differentiate two or more things or actions, and do not signify anything else, including order of importance, sequence, etc.

The term "finger" as used herein is defined as a structure extending from another structure, e.g., housing or cap. A finger may be elongated. A finger may extend axially from an end of a structure, e.g., housing or cap. A finger may be spaced radially on a structure, e.g., housing or cap. A finger may have an inner surface and an outer surface. A finger may have an outer surface capable of being abutted against a lip of a cap. A finger may have an inner surface capable of being abutted against a seal. A finger may be resiliently biased. A finger may be spaced radially on a structure, e.g., housing or cap. A plurality of fingers disposed radially as a part of an object, e.g., housing or sleeve, may form a compressible portion of the object.

The term "housing" as used herein is defined as a structure capable of removably coupling to an object, e.g., housing, cap, seal, splice, and/or terminal of an electrical cable. A housing may be cylindrical. A housing may be constructed from high-dielectric material, e.g., plastic, acetyl, polyamide, polytetrafluoroethylene (PTFE), polyvinyl chloride (PVC), polyvinylidene fluoride, or polyvinylidene difluoride (PVDF). A housing may be constructed from metal, e.g., aluminum, titanium, brass, stainless steel, and copper. A housing may have an aperture capable of receiving a connector such that the splice, in some cases, may not be in physical contact with the non-threaded portion of the housing. A housing may have a threaded portion having a first diameter and a non-threaded portion having a second diameter. A housing may have a threaded portion having a first diameter and a non-threaded portion having a second diameter that is smaller than or equal to the first diameter of the threaded portion. Also, a housing having a non-threaded portion capable of receiving a connector such that the splice, in some cases, may not be in physical contact with the non-threaded portion of the housing. Preferably, a housing has an internal shoulder capable of being abutted against another housing, a sleeve, or a cap. Additionally, a housing may have an external shoulder capable of being abutted against another housing, a sleeve, or a cap. A housing may have an axial bore through which a connector may pass or extend. In other words, the connector may enter a first end of the housing and exit a second end of the housing. A housing may have pin threads capable of being coupled to box threads of a sleeve, a cap, or another housing. A housing may have box threads capable of being coupled to box threads of a sleeve, a cap, or another housing. A housing may have fingers disposed parallel with a central axis of the housing. A housing may have fingers having a seal disposed around the fingers. A housing may have fingers for receiving a seal between the fingers. A housing may have fingers that form an aperture for receiving a seal within the aperture.

The term "lock" as used herein is defined as a structure configured, sized, and/or shaped for coupling two or more objects together. For example, a lock may be used to couple a landing mandrel to a landing seat. Types of locks may include a lug, a steel ball, a slip, a dog, a collect, a ring, and a sleeve. A lock may inhibit movement of a first object in one or more directions, e.g., radially and/or axially. A lock may be disposed in grooves or apertures of one or more objects, e.g., landing mandrel and/or landing seat. A lock may be disposed circumferentially on an object, e.g., landing mandrel and/or landing seat. A lock may be a disposed on an outer surface of an object, e.g., landing mandrel. A lock may be a ring disposed on an inner surface of an object, e.g., landing seat. A lock may have a surface abutted against an object. A lock may have teeth. A lock may have teeth capable of being coupled to teeth or threads disposed on an object, e.g., landing seat. A lock may have a first portion abutted against a surface of a first object and a second portion abutted against a surface of a second object. For example, a lock may have a first portion abutted against a surface of a landing mandrel and a second portion abutted against a surface of a landing seat. A lock may have outer socket surfaces capable of being aligned with inner socket surfaces of a landing seat. A lock may have outer socket surfaces aligned with inner socket surfaces of a landing seat.

Figure 7:
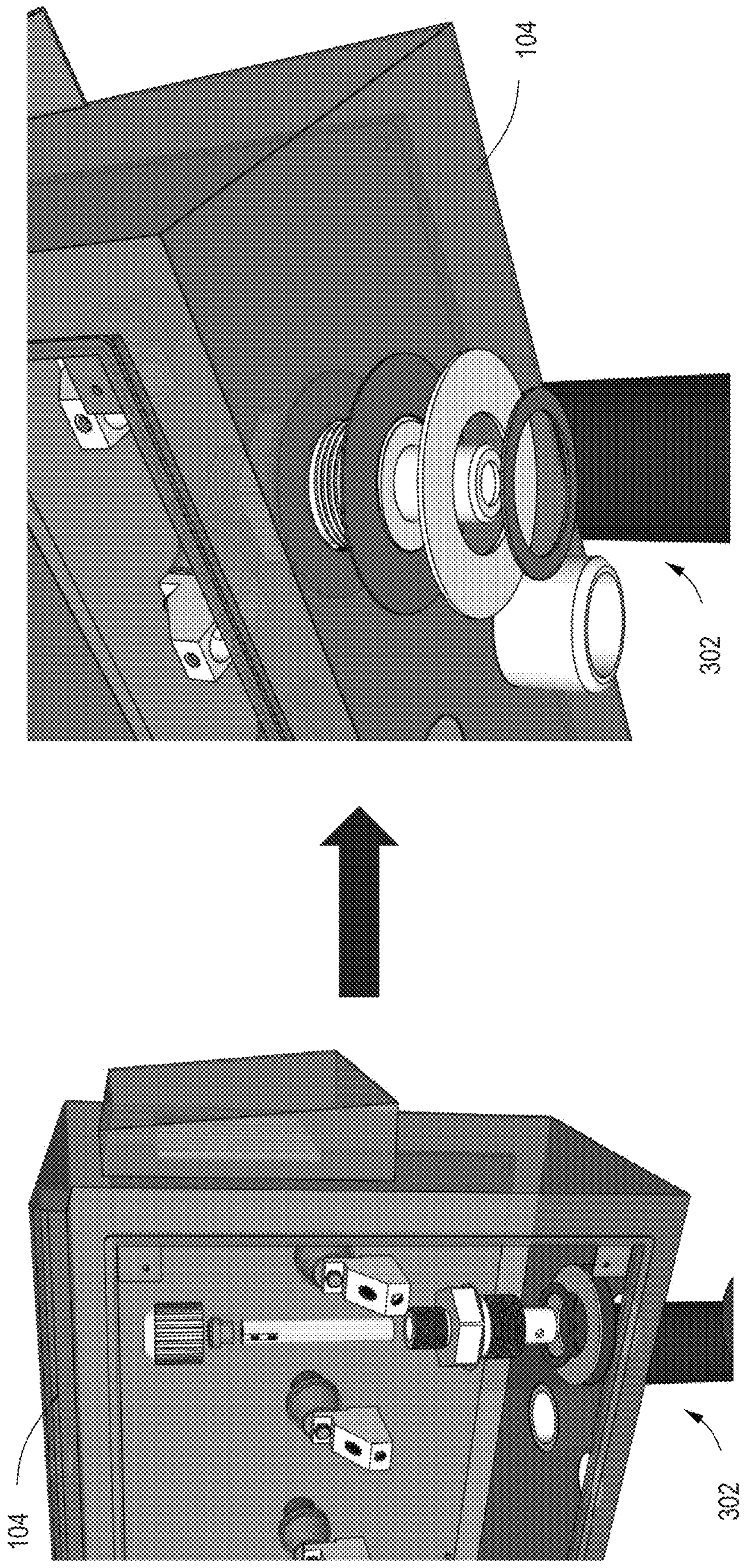
FIG. 7 illustrates an exploded view of components of a first housing disposed relative to a junction box.
Figure 8:
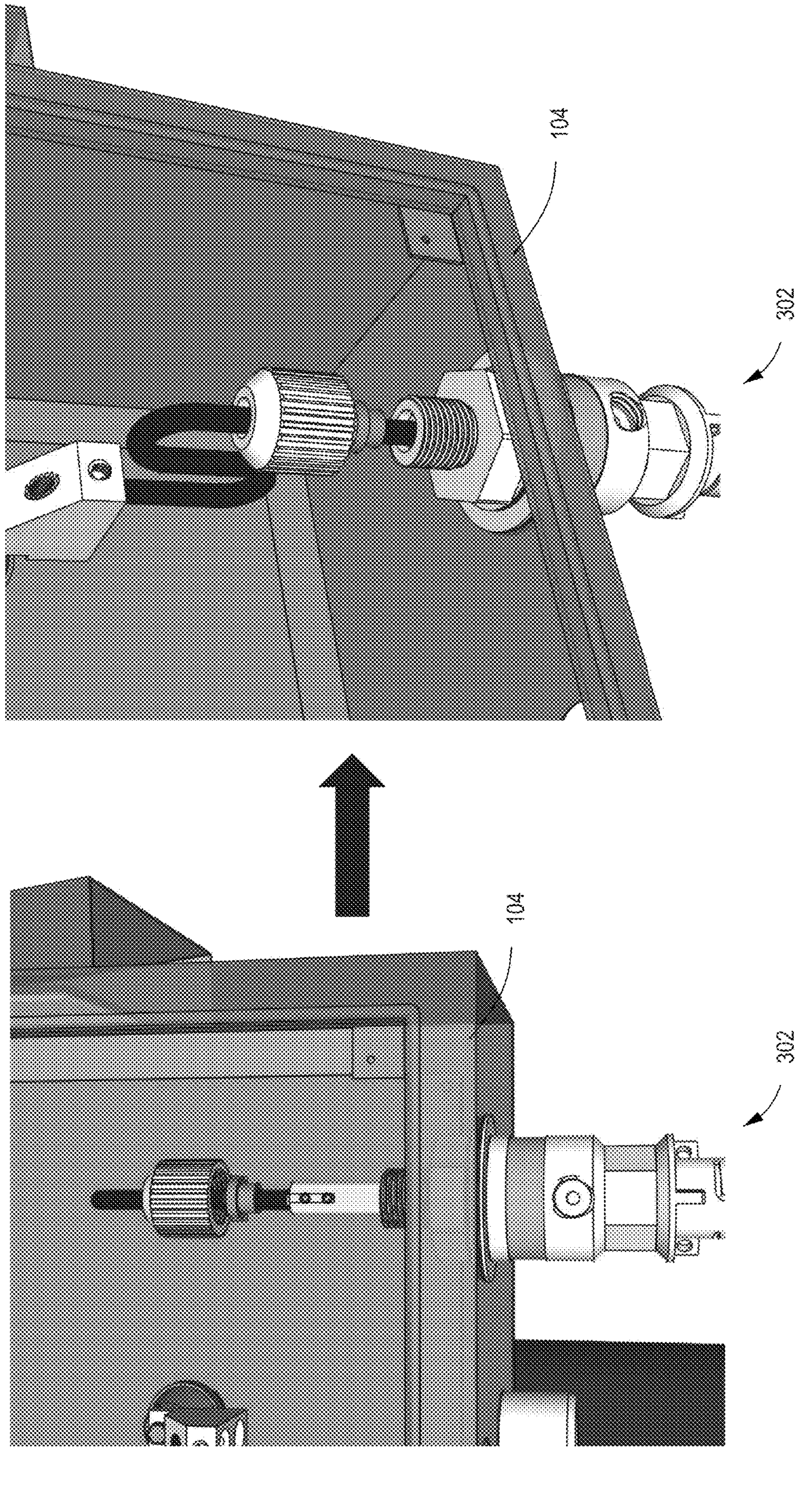
FIG. 8 illustrates a perspective view of a sequence for coupling a first housing to a junction box.

The term "non-threaded" as used herein is defined as having no threads. A non-threaded portion may be any portion of a structure or surface that has no threads. A non-threaded portion may, for example, refer to a cylindrical substructure of a housing with two opposing circular ends and a smooth or substantially smooth outer surface with no threads on any part of the outer surface. A housing, a cap, and/or a gland may each include a "threaded portion" wherein a section of the housing includes a section of the housing without threads, e.g., a smooth portion of a housing. As shown in FIGS. 6-8, a non-threaded portion of a housing may, for example, have a diameter sized so that a connector can be received in an aperture of the housing.

The term "perpendicular" as used herein is defined as at an angle of substantially 90°, e.g., to a line, a plane, or a surface, e.g., ranging from 85° or 88 to 92° or 95°. Two structures that are perpendicular to each other may be orthogonal and/or tangential to each other.

The term "providing" as used herein is defined as making available, furnishing, supplying, equipping, or causing to be placed in position.

The term "seal" as used herein used as a noun is defined as a structure capable of sealably coupling to an electrical cable, a housing, and/or a cap. A seal may be deformed, e.g., by fingers, around an electrical cable to sealably couple to the electrical cable. A seal may be disposed around one or more portions of housing or a sleeve, e.g., wall or fingers. A seal may be disposed between and/or within portions of a housing or a sleeve, e.g., wall or fingers. A seal may be biased by fingers of a housing or a sleeve. A seal may be constructed from high-dielectric material, e.g., elastomer, plastic, latex, rubber, nitrile rubber, butyl rubber, silicone, neoprene, and/or polyvinyl chloride. A seal may be constructed from resilient material, e.g., elastomer, plastic, latex, rubber, nitrile rubber, butyl rubber, silicone, neoprene, and/or polyvinyl chloride. A seal may be disposed between threaded portions, e.g., box threads and pin threads, that are coupled. A seal may have frusto-conical, e.g., tapered end. A seal may have frusto-conical, e.g., a tapered end and a cylindrical end. A seal may have one or more circumferential grooves disposed between a frusto-conical, e.g., tapered end and a cylindrical end. A seal may have frusto-conical, e.g., tapered end that is capable of extending through a lip of a housing. The term "seal" used herein used as a verb means to inhibit ingress and/or egress.

The term "sleeve" as used herein is defined as a structure capable of removable coupling to a housing and/or a cap. A sleeve may be constructed from high-dielectric material, e.g., plastic, acetyl, polyamide, polytetrafluoroethylene (PTFE), polyvinyl chloride (PVC), polyvinylidene fluoride, or polyvinylidene difluoride (PVDF). A sleeve may be constructed from metal, e.g., aluminum, titanium, brass, stainless steel, and copper. A sleeve may have pin threads, e.g., male threads, capable of engagement with box threads, e.g., female threads, of a housing and/or a cap. A sleeve may have box threads, e.g., female threads, capable of engagement with pin threads, e.g., male threads, of a housing and/or a cap. A sleeve may have an aperture disposed therethrough, which aperture is capable is capable of having a portion of an electrical cable, e.g., terminal, extending therethrough. A sleeve may have fingers disposed parallel with a central axis of the sleeve. A sleeve may have fingers having a seal disposed around the fingers. A sleeve may have fingers for receiving a seal between the fingers. A sleeve may have fingers that form an aperture for receiving a seal within the aperture.

The term "splice" as used herein as a verb, e.g., spliced and splicing, is defined as to directly or indirectly coupled two or more objects, e.g., electrical cables. The term "splice" as used herein as a noun is defined as a characteristic or quality of being spliced together, e.g., a union. For instance, a splice may exist between two electrical cables that are coupled, e.g., electrically, and/or physically, to a connector. Electricity can flow between two spliced electrical cables.

The term "socket surfaces" as used herein is defined as connected surfaces having a polygonal cross-section. An example of a polygonal cross-section may be triangular, square, rectangular, pentagonal, hexagonal, or octagonal. Socket surfaces may have planar walls connected to form a polygonal, e.g., triangular, square, rectangular, pentagonal, hexagonal, or octagonal, shape. Males socket surfaces may be disposed on an outer surface of a cylindrical structure, e.g., housing, sleeve, cap, rod, or bolt. Female socket surfaces may be disposed on an inner surface of a cylindrical structure, e.g., housing, sleeve, cap, rod, or bolt. Socket surfaces may be coupled to a wrench, e.g., a socket wrench and/or a crescent wrench.

The term "surface" as used herein is defined as any face of a structure. A surface may also refer to that flat or substantially flat area that is extended radially around a cylinder which may, for example, be part of a housing, a sleeve, sleeve, a seal, or a cap. A surface may have irregular contours. A surface may be formed from components, e.g., housings, cable gland assemblies, gland bodies, seals, and/or caps, coupled together. Coupled components may form irregular surfaces.

The term "terminal" as used herein is defined as an end portion of a structure, e.g., electrical cable. A terminal may include an insulated portion and a conductive portion. The insulated portion may also be referred to as a cover, a cladding, or a sheath. The conductive portion may be exposed and/or unsheathed, e.g., have not cover. A terminal may have a conductive portion disposed within an insulated portion. A terminal may have a conductive portion extending from a sheathed portion. A first terminal may be conductively coupled to a second terminal, e.g., via a connector.

The term "threaded" as used herein is defined as having threads. Threads may include one or more helical protrusions or grooves on a surface of a cylindrical object. Each full rotation of a protrusion or groove around a threaded surface of the object is referred to herein as a single "thread." Threads formed on an inner surface of an object, e.g., housing, sleeve, seal, or cap, may be referred to as box threads or female threads. Threads formed on an outer surface of an object, e.g., housing, sleeve, seal, or cap, may be referred to as pin threads or male threads. A threaded assembly may include a "threaded portion" wherein a section of the threaded assembly includes threads, e.g., pin threads or box threads. A threaded portion may have a diameter sized to extend through an aperture of a module coupler body. In certain cases, a threaded portion of a structure may be removably coupled to a threaded assembly.

The term "tubular" as used herein is defined any structure having an inner surface and an outer surface. A tubular may have an aperture disposed therethrough. Preferably, a tubular is cylindrical. However, any or all tubulars of an assembly, e.g., housing, sleeve, seal, or cap, may have polygonal cross-sections, e.g., triangular, rectangular, pentagonal, hexagonal, or octagonal.

The term "unitary" as used herein defined as having the nature, properties, or characteristics of a single unit. For example, a housing portion and fingers that are distinct parts of a housing are unitary in the sense they work together to fulfill the intended purpose of the housing. A unitary housing may be formed, e.g., mold or carved, from a single piece of material, e.g., of plastic, carbon fiber, metal, or wood.

The terms "upper," "lower," "top," "bottom" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions. For example, a wellbore may have an upper end and a lower end. Additionally, a cylindrical object, e.g., housing, sleeve, seal, cap, or electrical cable, may have an upper portion and a lower portion. The term "top" as used herein means in the highest position, e.g., farthest from the ground. The term "bottom" as used herein means in the lowest position, e.g., closest the ground. For example, a cylindrical object, e.g., housing, sleeve, seal, cap, or electrical cable, may have a top portion and a bottom portion.

3. Certain Specific Embodiments

The disclosure herein includes apparatuses that include cable splice assemblies, and also includes junction boxes to which one or more cable splice assemblies are coupled, and which junction boxes and cable splice assemblies preferably receive electrical cables that extend upward from a downhole pump in an oil or gas or water well to the junction box. Preferably the apparatus includes at least three such cable splice assemblies, and each apparatus may include one or more of the following: a cable splice assembly for splicing a first electrical cable terminal, that is at least partially disposed in a junction box, to a second electrical cable terminal, the cable splice assembly may include: a first housing coupled to the junction box and to a portion of the first electrical cable terminal, wherein the first housing may include a first wall; and a second housing coupled to the first housing and to a portion of the second electrical cable terminal, wherein the first housing may include a second wall; and a port disposed in the first wall or the second wall; a pin disposed in the port, wherein the pin may be conductively coupled to the first terminal or the second terminal.

Additionally, the disclosure herein includes cable splice assemblies and methods for splicing a first electrical cable terminal, at least partially disposed in a junction box, to a second electrical cable terminal that may each include a cable splice assemblies which may include: a first housing coupled to the junction box and to a portion of the first electrical cable terminal, wherein the housing may include a wall having a port extending through the wall; and a second housing coupled to the first housing and to a portion of the second electrical cable terminal; a plug having a portion disposed in the port; and a pin having a portion extending out of the plug, wherein the pin may be conductively coupled to the first terminal Also, the disclosure herein includes cable splice assemblies and methods for splicing a first electrical cable terminal, at least partially disposed in a junction box, to a second electrical cable terminal that may each include a cable splice assemblies which may include: a housing capable of being coupled to the junction box and to a portion of the first electrical cable terminal, wherein the housing may include a wall having a port extending through the wall; and a second housing capable of being coupled to the first housing and to a portion of the second electrical cable terminal; a plug having a portion disposed in the port; and a pin capable of having a portion disposed in the port, wherein the pin is capable being conductively coupled to the first terminal.

Further, the disclosure herein includes cable splice assemblies and methods for splicing a first electrical cable terminal, at least partially disposed in a junction box, to a second electrical cable terminal that may each include a cable splice assemblies which may include: a housing capable of receiving therein a portion of the first electrical cable terminal, wherein the housing may include a wall having a port extending through the wall; and a pin capable of having a portion disposed in the port, wherein the pin is capable of being conductively coupled to the first terminal.

In addition, the disclosure herein includes cable splice assemblies and methods for splicing a first electrical cable terminal, at least partially disposed in a junction box, to a second electrical cable terminal that may each include a cable splice assemblies which may include: a first housing capable of receiving therein a portion of the first electrical cable terminal, wherein the first housing may include a port extending therethrough; a second housing capable of receiving therein a portion of the second electrical cable terminal and capable of being coupled to the first housing; and a pin capable of having a portion disposed in the port, wherein the pin is capable of being conductively coupled to the first terminal.

Moreover, the disclosure herein includes cable splice assemblies and methods for splicing a first electrical cable terminal, at least partially disposed in a junction box, to a second electrical cable terminal that may each include a cable splice assemblies which may include: a first housing capable of receiving therein a portion of the first electrical cable terminal; a second housing capable of receiving therein a portion of the second electrical cable terminal and capable of being coupled to the first housing; a plug that may be removably coupled to the first housing; and a pin having a portion that may extend through the plug and the first housing.

Furthermore, the disclosure herein includes cable splice assemblies and methods for splicing a first electrical cable terminal, at least partially disposed in a junction box, to a second electrical cable terminal that may each include a cable splice assemblies which may include: a first housing that may have a portion of the first electrical cable terminal disposed therein, wherein the first housing may include a port extending therethrough; a second housing coupled to the first housing and having a portion of the second electrical cable terminal disposed therein; a plug that may be disposed in the port; and a pin that may have a portion extending through the plug and the port, wherein the pin may be conductively coupled to the first terminal.

The disclosure herein includes cable splice assemblies and methods for splicing a first electrical cable terminal, at least partially disposed in a junction box, to a second electrical cable terminal that may each include a cable splice assemblies which may include: a first housing that may include: a first terminal end for receiving therein a portion of the first electrical cable terminal; and a first locking aperture; and a second housing that may include: a second terminal end for receiving therein a portion of the second electrical cable terminal; and a second locking aperture, wherein the second locking aperture may be capable of being aligned with the first locking aperture to receive a portion of a lock therethrough.

The disclosure herein includes cable splice assemblies and methods for splicing a first electrical cable terminal, at least partially disposed in a junction box, to a second electrical cable terminal that may each include a cable splice assemblies which may include: a lock; a first housing that comprises: a first terminal end that may have a portion of the first electrical cable terminal disposed therein; and a first locking aperture; and a second housing that may include: a second terminal end that may have a portion of the second electrical cable terminal disposed therein; and a second locking aperture that may be aligned with the first locking aperture, wherein a portion of the lock may extend through the first locking aperture and the second locking aperture.

The disclosure herein includes cable splice assemblies and methods for splicing a first electrical cable terminal, at least partially disposed in a junction box, to a second electrical cable terminal that may each include a cable splice assemblies which may include: 1) a first housing for coupling, coupled to, or that is capable of being coupled to a junction box, wherein the first housing may have: a) a first housing end; and b) a first terminal end for receiving therein a portion of a first electrical cable terminal; 2) a second housing that may have: a) a second housing end for coupling, coupled to, or that is capable of being coupled to the first housing end; and b) a second terminal end for receiving therein a portion of a second electrical cable terminal; 3) a first connector the first electrical cable terminal preferably while disposed fully or partially in the first housing; 4) a second connector for coupling, coupled to, or that is capable of being coupled to the second electrical cable terminal preferably while disposed fully or partially in the second housing and for coupling to the first connector; 5) a first seal that may be disposed in the first housing, preferably for sealable coupling to the first electrical cable terminal; 6) a second seal that may be disposed in the second housing for sealable coupling to the second electrical cable terminal; 7) a first cap that presses or is capable of pressing the first seal against the first terminal end; and 8) a second cap that presses or is capable of pressing the second seal against the second terminal end.

The disclosure herein includes cable splice assemblies and methods for splicing a first electrical cable terminal, at least partially disposed in a junction box, to a second electrical cable terminal that may each include a cable splice assemblies which may include: 1) a first housing for coupling, coupled to, or that is capable of being coupled to a junction box, wherein the first housing may have: a) a first housing end; and a first terminal end for receiving therein a portion of the first electrical cable terminal; 2) a second housing that may have: a) a second housing end for coupling, coupled to, or that is capable of being coupled to the first housing end; and b) a second terminal end for receiving therein a portion of the second electrical cable terminal; 2) a first connector for coupling, coupled to, or that is capable of being coupled to the first electrical cable terminal while disposed in the first housing; 3) a second connector for coupling, coupled to, or that is capable of being coupled to the second electrical cable terminal while disposed in the second housing and for coupling, coupled to, or that is capable of being coupled to the first connector; 4) a first cap for covering the first terminal end; and 5) a second cap for covering the second terminal end.

The disclosure herein includes cable splice assemblies and methods for splicing a first electrical cable terminal, at least partially disposed in a junction box, to a second electrical cable terminal that may each include a cable splice assemblies which may include: 1) a first housing for coupling, coupled to, or that is capable of being coupled to a junction box, wherein the first housing may have: a) a first housing end; and a) a first terminal end for receiving therein a portion of the first electrical cable terminal; and b) a port extending through a portion of the first housing; 2) a second housing that may have: a) a second housing end for coupling, coupled to, or that is capable of being coupled to the first housing end; and b) a second terminal end for receiving therein a portion of the second electrical cable terminal; 3) a first connector for coupling, coupled to, or that is capable of being coupled to the first electrical cable terminal while disposed in the first housing, wherein the first connector may be accessible through the port; 4) a second connector for coupling, coupled to, or that is capable of being coupled to the second electrical cable terminal while disposed in the second housing and for coupling to the first connector; 5) a plug having plug portion capable of extending through the port into physical contact with the first connector; 6) a first cap for covering the first terminal end; and 7) a second cap for covering the second terminal end.

The disclosure herein includes cable splice assemblies and methods for splicing a first electrical cable terminal, at least partially disposed in a junction box, to a second electrical cable terminal that may each include a cable splice assemblies which may include: 1) a lock; 2) a first housing for coupling to the junction box, wherein the first housing may have: a) a first terminal end for receiving therein a portion of the first electrical cable terminal; and b) a first locking aperture; 3) a second housing that may have: a) a second terminal end for receiving therein a portion of the second electrical cable terminal; and b) a second locking aperture, wherein the second locking aperture may be capable of being aligned with the first locking aperture to receive a portion of the lock therethrough; 4) a first cap for covering the first terminal end; and 5) a second cap for covering the second terminal end.

The disclosure herein includes methods for splicing a first electrical cable terminal and a second electrical cable terminal to a junction box, which methods may each include one or more of the following steps: 1) providing a cable splice assembly that may include: a) a first housing having: i) a first housing end; and ii) a first terminal end; b) a second housing having: i) a second housing end; and ii) a second terminal end; c) a first connector; d) a second connector; e) a first seal; f) a second seal; g) a first cap; and h) a second cap; 2) extending the first electrical terminal through the first cap and the first seal into the first terminal end; 3) coupling the first connector to the first electrical cable terminal in the first housing; 4) sealably coupling the first cap with the first terminal end; 5) extending the second electrical terminal through the second cap and the second seal into the second terminal end; 6) coupling the second connector to the second electrical cable terminal end in the second housing; 7) sealably coupling the second cap with the second terminal end; 8) coupling the first connector to the second connector, wherein the first connector and the second connector may be capable of electrical communication; 9) coupling the first housing end to the second housing end, wherein the first connector and the second connector may be insulated; and 10) coupling the first housing to the junction box.

The disclosure herein includes methods for splicing a first electrical cable terminal and a second electrical cable terminal on a junction box, which methods may each include: 1) providing a cable splice assembly that may include: a first housing having: i) a first housing end; and ii) a first terminal end for receiving the first electrical cable terminal; a second housing having: i) a second housing end; and ii) a second terminal end for receiving the second electrical cable terminal; c) a first connector; and d) a second connector; 2) coupling the first connector to the first electrical cable terminal in the first housing; 3) coupling the second connector to the second electrical cable terminal end in the second housing; 4) coupling the first connector to the second connector, wherein the first connector and the second connector may be capable of electrical communication; 5) coupling the first housing end to the second housing end; and 6) coupling the first housing to the junction box.

The disclosure herein includes methods for splicing a first electrical cable terminal and a second electrical cable terminal on a junction box, which methods may each include: 1) providing a cable splice assembly that may include: a first housing that may have: i) a first housing end; and ii) a first terminal end for receiving the first electrical cable terminal; and iii) a port extending through a portion of the first housing; b) a second housing that may have: i) a second housing end; and ii) a second terminal end for receiving the second electrical cable terminal; c) a first connector; d) a second connector; and e) a plug having a plug portion; 2) coupling the first connector to the first electrical cable terminal in the first housing; 3) coupling the second connector to the second electrical cable terminal end in the second housing; 4) coupling the first connector to the second connector; 5) coupling the first housing end to the second housing end; 6) extending the plug portion through the port; 7) abutting the plug portion against the first connector; and 8) coupling the first housing to the junction box.

The disclosure herein includes methods for splicing a first electrical cable terminal and a second electrical cable terminal on a junction box, which methods may each include: 1) providing a cable splice assembly that may include: a) a first housing having: i) a first terminal end for receiving the first electrical cable terminal; and ii) a first locking aperture; a second housing having: a second terminal end for receiving the second electrical cable terminal; and iii) a second locking aperture; b) a first connector; c) a second connector; and d) a lock; 2) coupling the first connector to the first electrical cable terminal in the first housing; 3) coupling the second connector to the second electrical cable terminal end in the second housing; 4) coupling the first connector to the second connector; 5) coupling the first housing to the second housing; 6) aligning the first locking aperture with the second locking aperture; extending a portion of the lock through the first locking aperture and the second locking aperture; and 7) coupling the first housing to the junction box.

The disclosure herein includes methods for splicing a first electrical cable terminal and a second electrical cable terminal on a junction box, which methods may each include: providing a cable splice assembly that may include: a first housing; a second housing; a port that may be disposed in either first housing or the second housing; a plug that may cover the port; and a pin; coupling either the first housing or the second a junction box; sealably coupling the first housing to the second housing; sealably coupling the first cable terminal to the first housing; sealably coupling the second cable terminal to the second housing; removing the plug from the port; extending a portion of the pin through the port; abutting the pin against either the first electrical cable terminal or the second electrical cable terminal.

In any one of the methods or structures disclosed herein, the port may extend towards a central axis of the either first housing or the second housing.

In any one of the methods or structures disclosed herein, the port may extend perpendicular to a central axis of either the first housing or the second housing.

In any one of the methods or structures disclosed herein, the first housing may have pin threads coupled to box threads disposed on the second housing.

In any one of the methods or structures disclosed herein, the first housing and the second housing may be sealably coupled.

Any one of the methods or structures disclosed herein may further include a plug capable of extending through the port.

Any one of the methods or structures disclosed herein may further include a plug capable of capable of covering through the port.

In any one of the methods or structures disclosed herein, the first housing may further include a first locking aperture and the second housing may further include a second locking aperture aligned with the first locking aperture.

Any one of the methods or structures disclosed herein may further include a lock having a portion disposed through a first locking aperture of the first housing and a second aperture of the second housing.

Any one of the methods or structures disclosed herein may the further comprise: a first locking aperture disposed on first housing; and a second locking aperture disposed on second housing, wherein the first locking aperture is capable being aligned with the second locking aperture to receive a lock therethrough.

Any one of the methods disclosed herein may further include inserting a pin of the second connector into a box of the first connector.

4. Specific Embodiments in the Drawings

The drawings presented herein are for illustrative purposes only and do not limit the scope of the disclosure. Rather, the drawings are intended to help enable one having ordinary skill in the art to make and use the assemblies disclosed herein.

This section addresses specific versions of junction box assembly shown in the drawings, which include assemblies, elements and parts that can be part of one or more junction box assembly or methods for coupling electrical cables to junction boxes. Although this section focuses on the drawings herein, and the specific embodiments found in those drawings, parts of this section may also have applicability to other embodiments not shown in the drawings. The limitations referenced in this section should not be used to limit the scope of the claims themselves, which have broader applicability than the structures disclosed in the drawings.

In oil and gas production, one or more electrical cables maybe coupled to a wellhead and a pump positioned downhole within a wellbore (not shown). The wellhead may be installed at the surface proximate the entrance to the wellbore.

The wellhead may include electrical components, e.g., motors, sensors, and valves, for monitoring and controlling flow of fluid, e.g., hydrocarbons, gas, and/or water, extracted from the wellbore. Electrical submersible pumps (not shown) may include electrical components, e.g., permanent magnetic motors, impellers, diverters, and valves, to propel and control flow of fluid, e.g., hydrocarbons, gas, and/or water, up to the wellhead.

Actuating any of those components may require electrical power, so they are usually connected to one or more electrical power sources (not shown) via electrical cables (see 102). In some cases, the electrical cables may be segmented to facilitate components replacement or removal for repairs. Segmented electrical cables may be spliced together to form longer electrical cables. Junction box assemblies may facilitate safe, quick connection and/or disconnection of the one or more spliced electrical cables.

FIG. 1 illustrates a perspective view of a junction box assembly 100. The junction box assembly 100 includes a junction box 104, a pole 106, and one or more cable splice assemblies 200. The junction box 104 may be set elevated on the pole 106.

In some cases, downhole electrical submersible pumps may require three-phase electricity so three electrical cables (for each phase) may be respectively spliced at the junction box assembly 100, as shown in FIG. 1. Splice assemblies 200*a-c* may be used to splice a respective set of electrical cables 102*a-c* with another respective set of electrical cables connected to a power source (not shown). It should be understood that any number of cables could be spliced for downhole applications.

Each splice assembly 200, may have a first housing 302 and a second housing 402. The first housing 302 may be coupled to the junction box 104. Also, the housing 302 may be coupled to an electrical cable, e.g., connected to a power supply (see 102*a*). A portion of the first electrical cable terminal may be disposed longitudinally in the first housing 302. The second housing 402 may be coupled to a respective electrical cable, e.g., connected to an electrical submersible pump (see 102*a*'). A portion of the second electrical cable may be disposed longitudinally in the second housing 402. Moreover, when the first housing 302 and the second housing 402 are coupled to the respective electrical cables, the first housing 302, the second housing 402, and respective portions of the electric cables dispose in the first housing 302 and the second housing 402 could be concentric.

Although FIG. 1 shows the first housing 302 being coupled to the junction box 104, it should be understood that the second housing 402 may be coupled to the junction box 104, rather than the first housing 302. Accordingly, the first housing 302 would be removable from the junction box after being coupled to the second housing 402.

Figure 2:
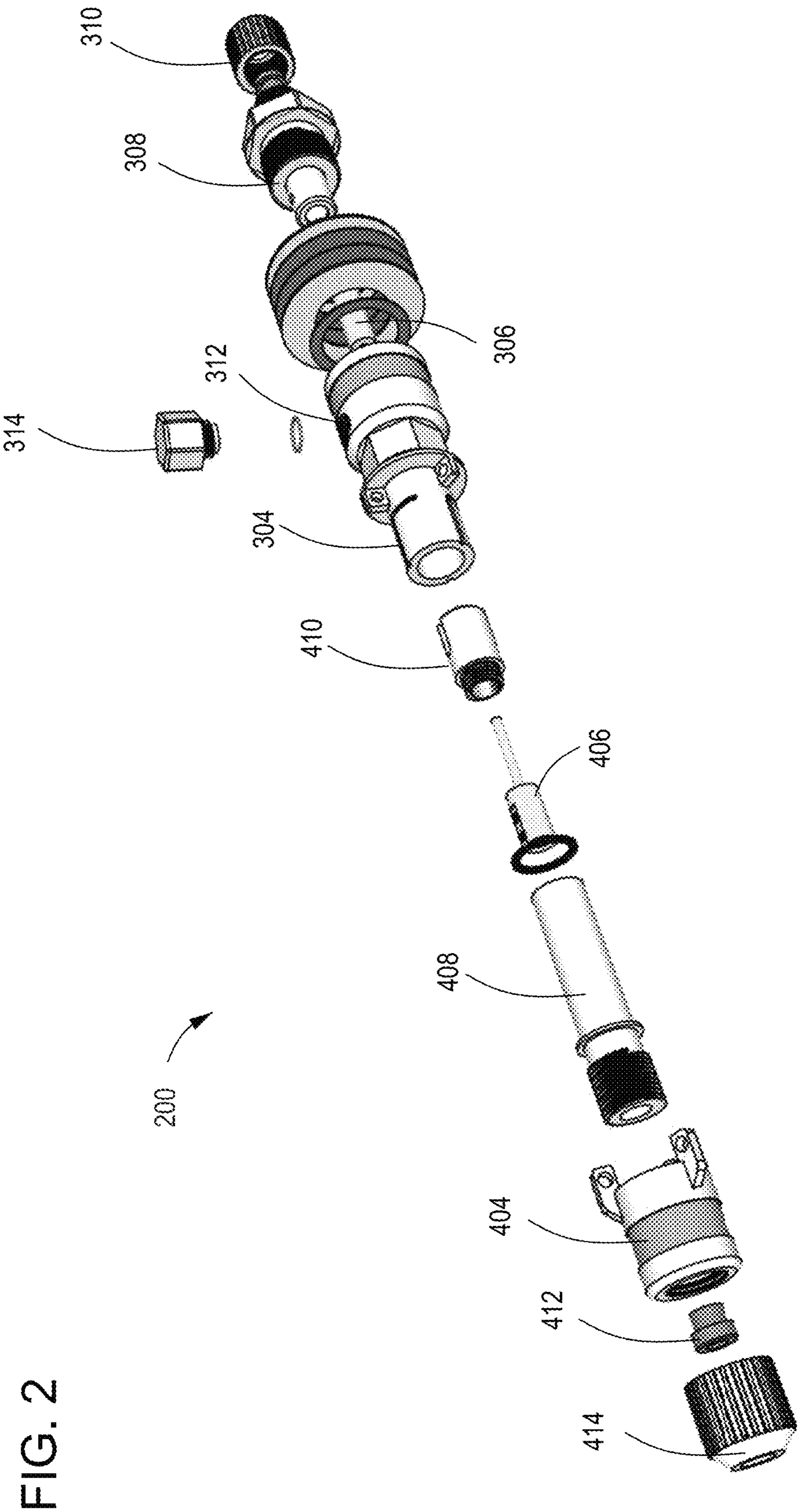
FIG. 2 illustrates an exploded perspective view of a cable splice assembly.

FIG. 2 illustrates an exploded perspective view of a cable splice assembly 100. The components of the cable splice assembly 100 may be grouped to form a first housing 302 (see FIG. 3) and a second housing 402 (see FIG. 4).

Figure 3:
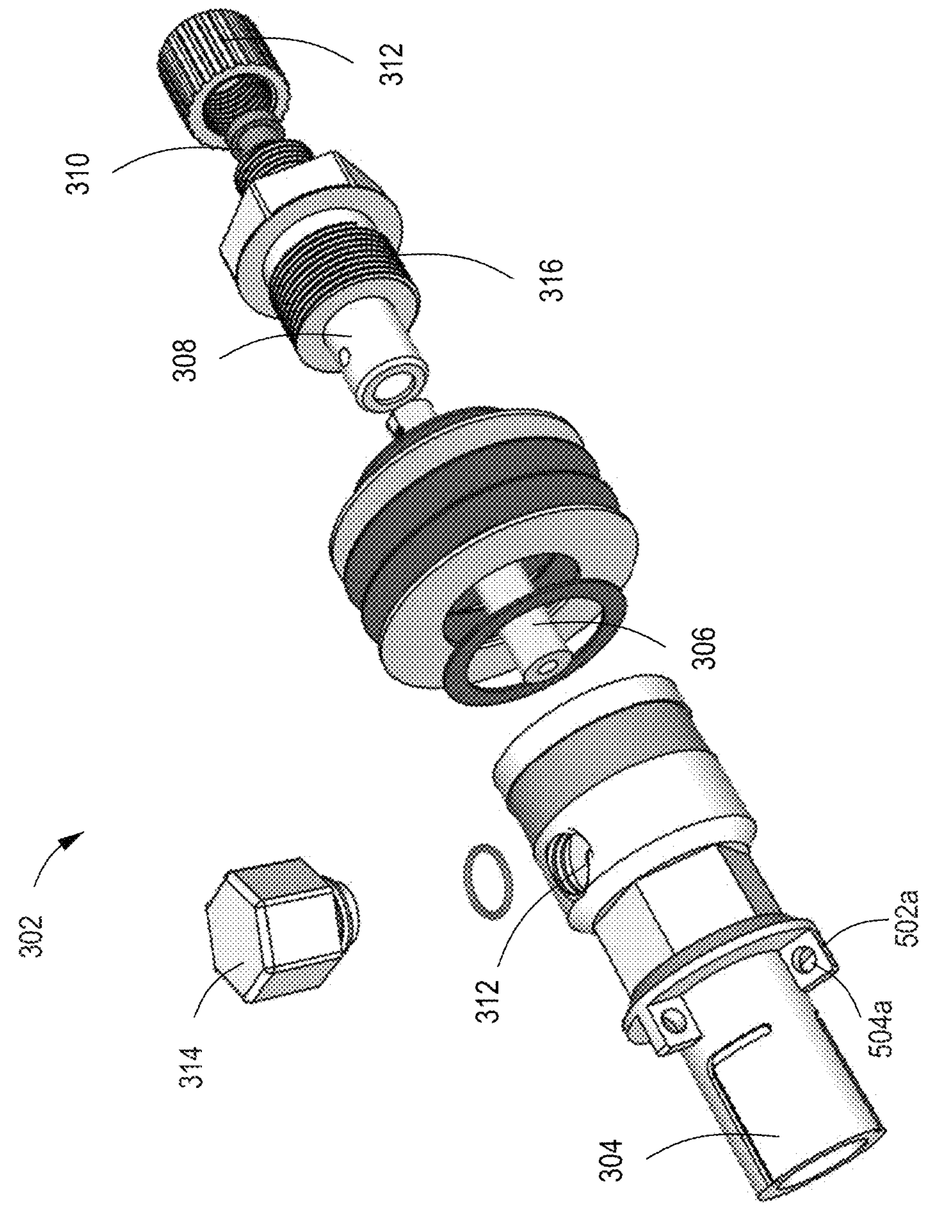
FIG. 3 illustrates an exploded perspective view of a first housing.
Figure 4A:
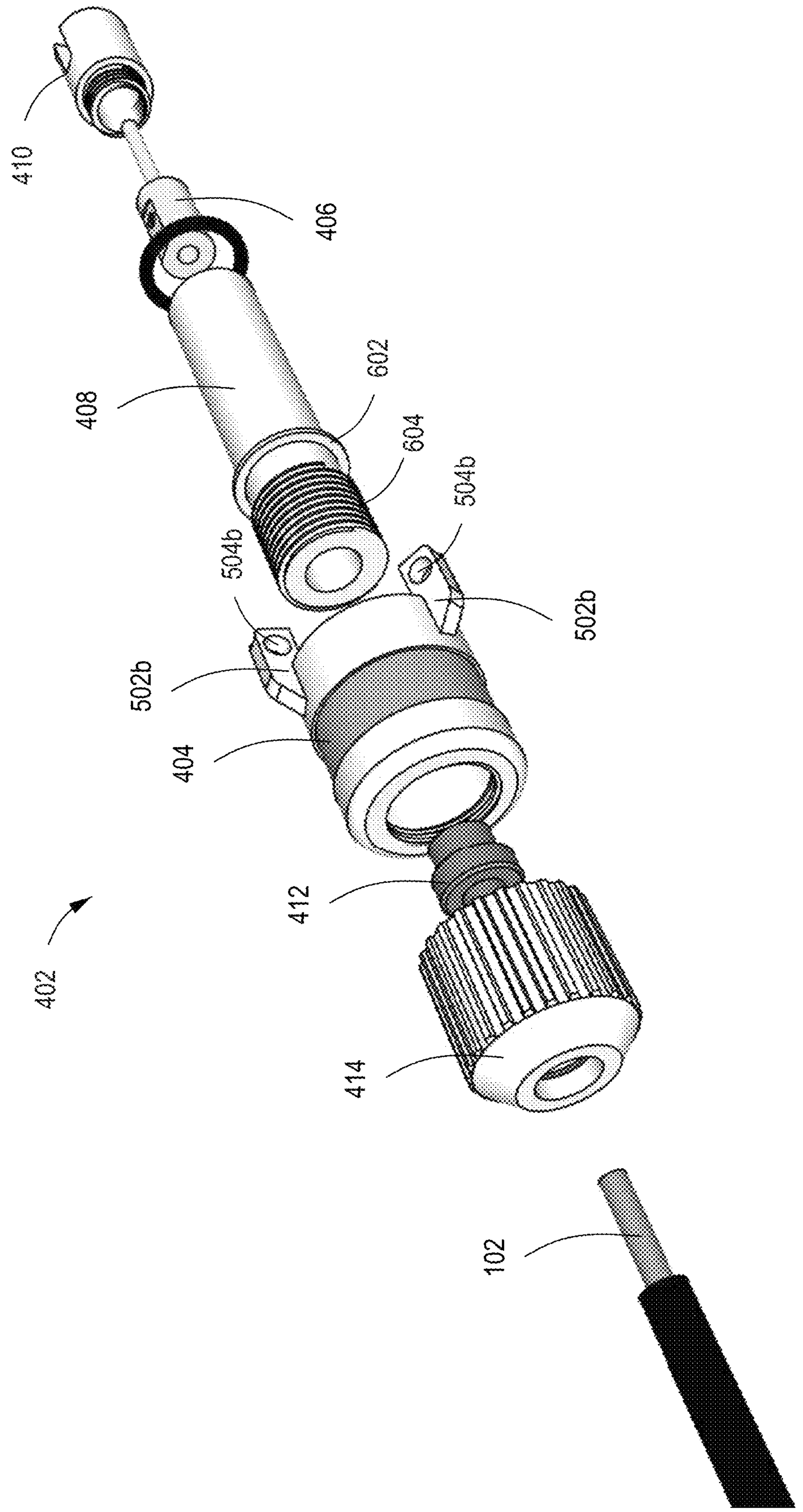
FIG. 4A illustrates an exploded perspective view of a second housing.
Figure 4B:
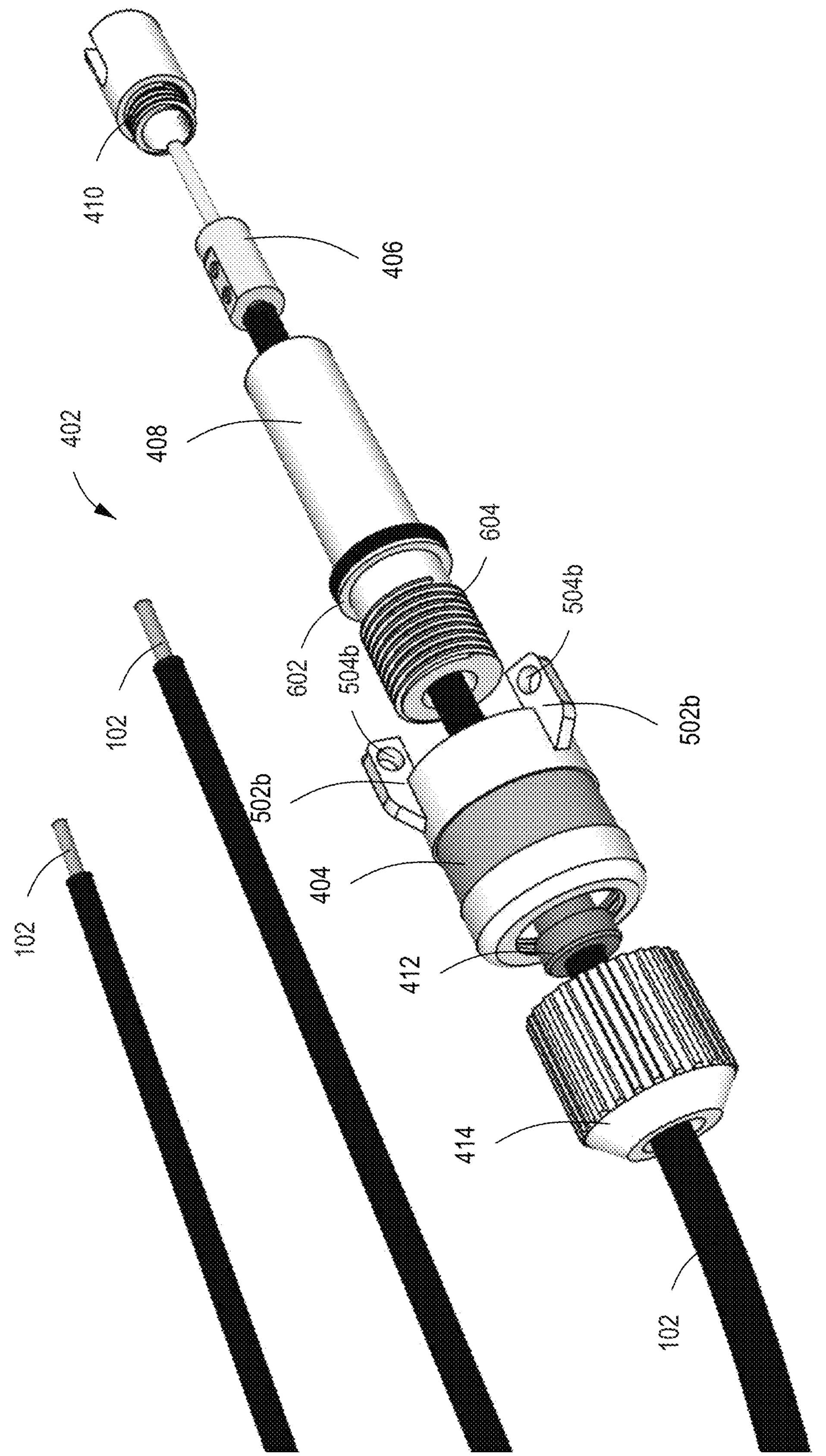
FIG. 4B illustrates an exploded perspective view of a second housing having an electrical cable terminal extending through portions of the second housing.
Figure 4C:
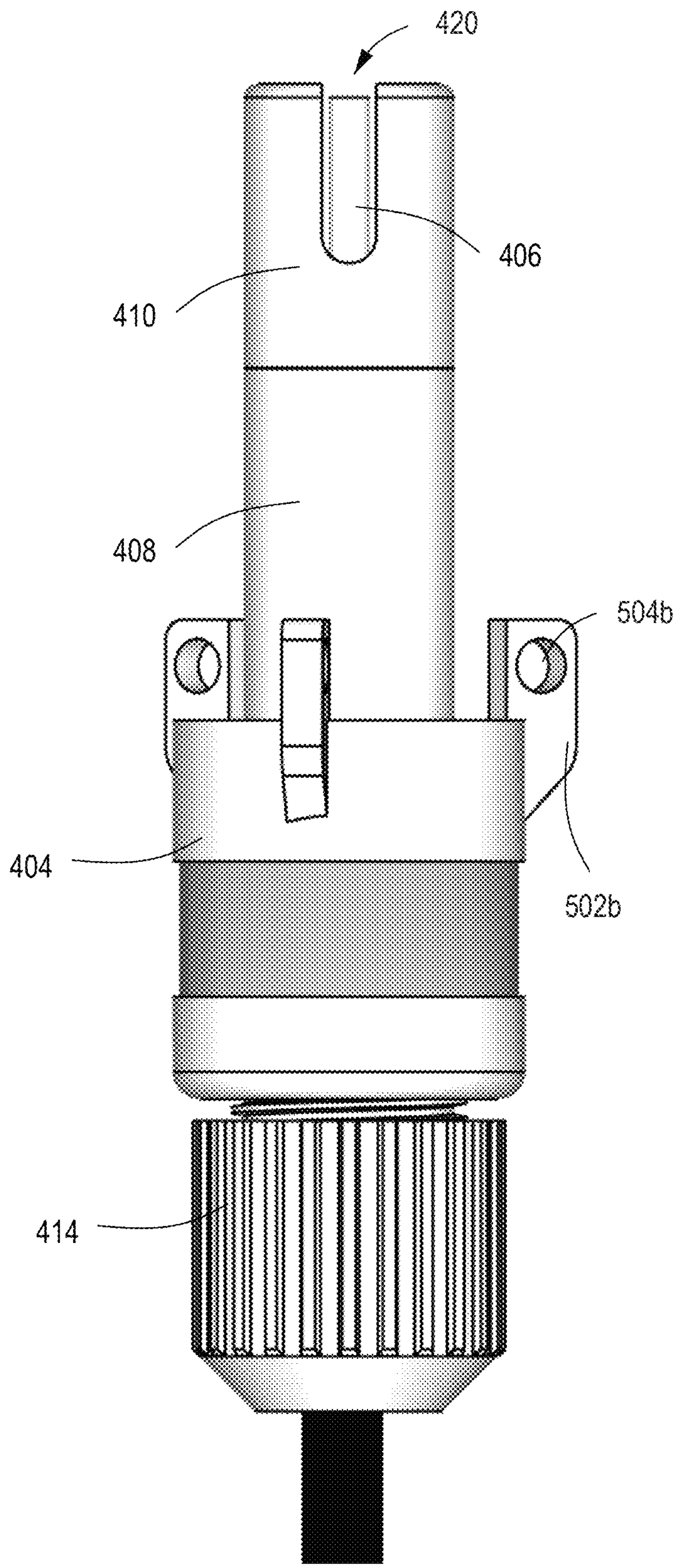
FIG. 4C illustrates a perspective view of the assembled second housing of FIG. 4B.

Referring to FIG. 2 and FIG. 3, the first housing 302 may include a first locking sleeve 304, a first connector 306, a bolt 308, a first seal 310, and a first cap 311. The first locking sleeve 304, the bolt 308, the first seal 310, and the first cap 311 may share a central axis. Moreover, the first locking sleeve 304, the bolt 308, the first seal 310, and the first cap 311 may each have a borehole extending therethrough.

The first locking sleeve 304 has an inner diameter greater than an outer diameter of the first connector 306 and an outer diameter of a threaded portion of the bolt 308. Additionally, the outer diameter of the first connector 306 is less than an inner diameter of the threaded portion of the bolt 308. Thus, the first connector 306 portions of the first connector 306 may be disposed between and/or within the first locking sleeve 304 and the bolt 308.

The first locking sleeve 304 has a box thread (not shown) capable of being threadably coupled to a pin thread 316 of the bolt 308. When the first connector 306 is disposed between and/or within first locking sleeve 304 and the bolt 308, they would retain the first connector 306 therebetween.

Referring to FIG. 2 and FIGS. 4A-C, the second housing 402 may include a second locking sleeve 404, a second connector 406, a protective sleeve 408, a testing sleeve 410, a second seal 412, and a second cap 414. The second locking sleeve 404, the protective sleeve 408, the testing sleeve 410, and the second cap 414 may share a central axis. Moreover, the second locking sleeve 404, the protective sleeve 408, the testing sleeve 410, the second seal 412, and the second cap 414 may each have a borehole extending therethrough.

Figure 5:
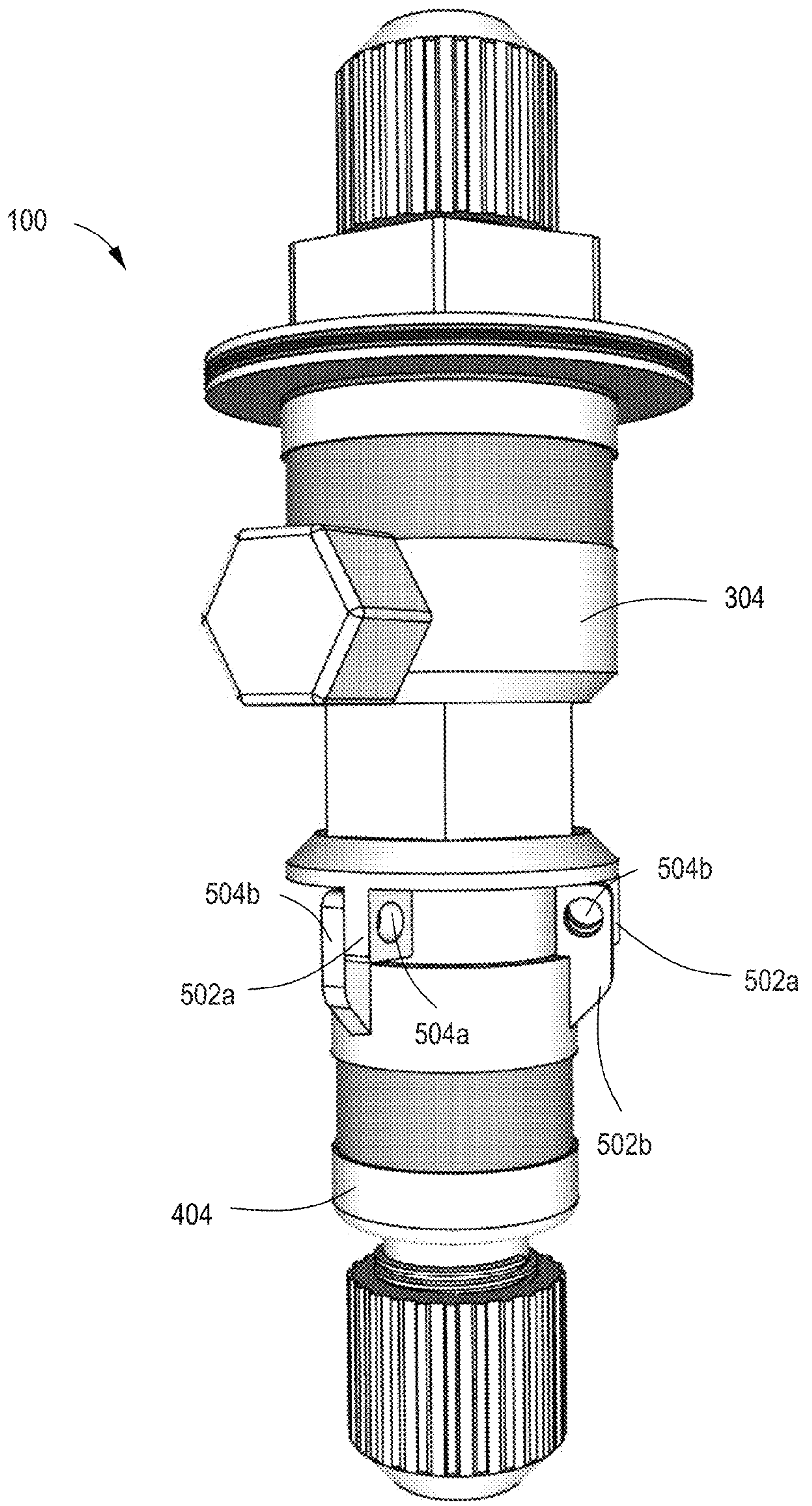
FIG. 5 illustrates a perspective view of an assembled cable splice assembly.

FIG. 5 illustrates a perspective view of an assembled cable splice assembly 100. The cable splice assembly 100 has a first housing 302 coupled to a second housing 402. The first housing has a first castellation 502*a* that may be abutted against second castellation 502*b*. Each castellation 502 may have an aperture 504. Respective apertures 504*a-b* may be aligned such that a portion of lock may extend through the apertures 504*a-b* (see FIG. 10). The lock may inhibit uncoupling of the first housing 302 from the second housing 402.

Figure 6A:
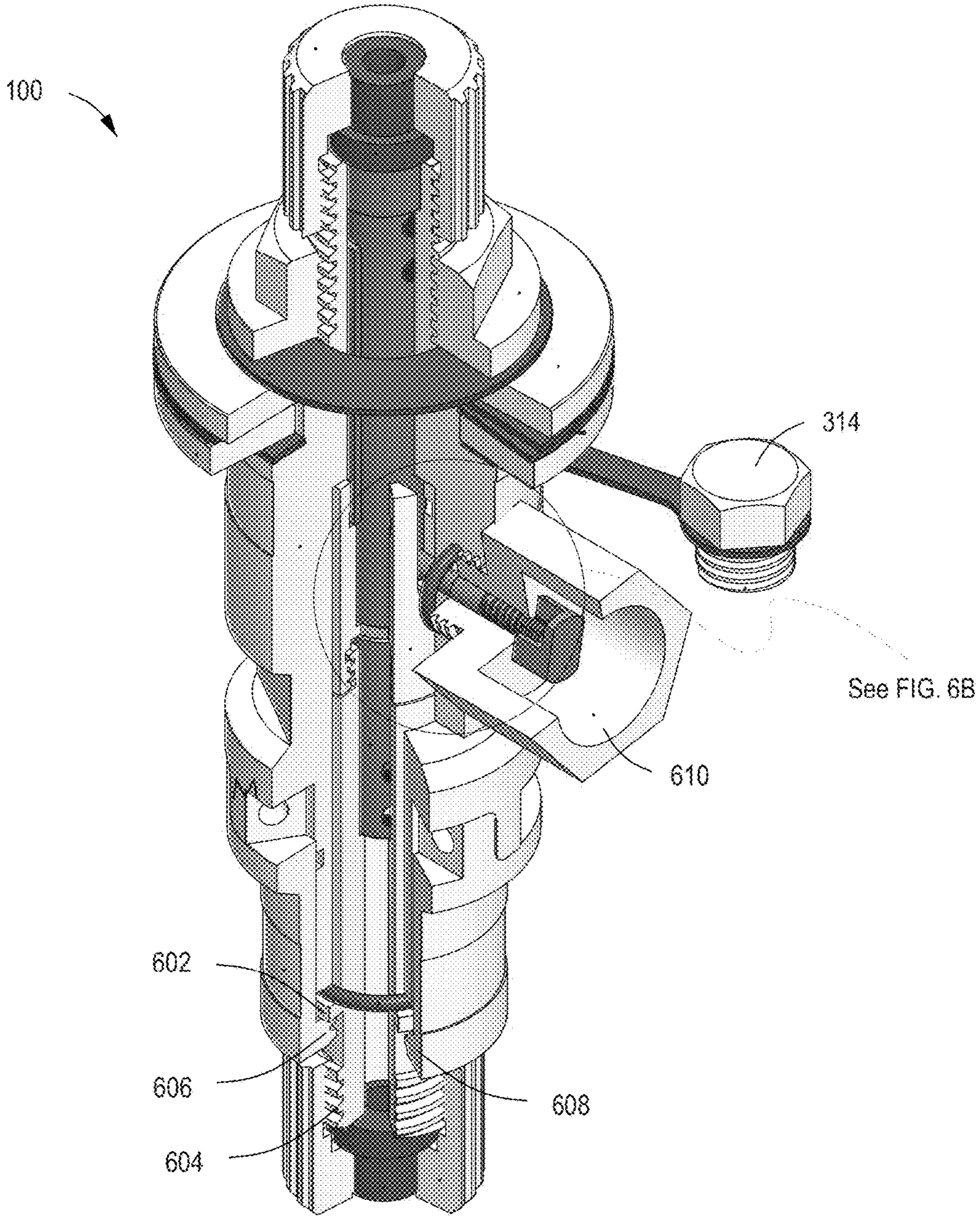
FIG. 6A illustrates a lateral cut-out perspective view of an assembled cable splice assembly having a test plug coupled to a first housing.

Referring to FIG. 6A, the outer diameter of the second connector 406 is less than an inner diameter of the testing sleeve 410. Thus, portions of the second connector 406 may be disposed between and/or within the protective sleeve 408 and the testing sleeve 410.

The protective sleeve 408 has a pin thread 604 capable of being threaded, e.g., extended, through a box thread 418 of the second locking sleeve 404. The pin thread 602 may extend through an end of the second locking sleeve 404. Once extended through the end of the second locking sleeve 404, the pin thread 604 could be threadably coupled to box threads 606 on the second cap 414. However, the protective sleeve 408 has a flange 602 that may inhibit the locking sleeve 408 from sliding completely through the locking sleeve 404. The flange 602 extends radially from the protective sleeve 408 such that it may be abutted against a collar 608 extending towards the center of the second locking sleeve 404, which, in some cases, may inhibit the protective sleeve 408 from being slid completely through the second locking sleeve 404.

In addition, the first locking sleeve 304 may have a first housing end having an outer diameter less than an inner diameter of a second housing end of the second locking sleeve 304. Also, the first housing end of the first locking sleeve 304 may have an inner diameter less than an outer diameter of the protective sleeve 408. Accordingly, when the cable splice assembly 100 is assembled (see FIG. 6A), the first housing end of the first locking sleeve 304 would be disposed within the second housing end but around a portion of the protective sleeve 408. Moreover, the first housing end may be abutted against a flange 602, which extend radially from the protective sleeve 408. Also, the flange 602 may be abutted against a collar 604 of the second locking sleeve 404.

Figure 6B:
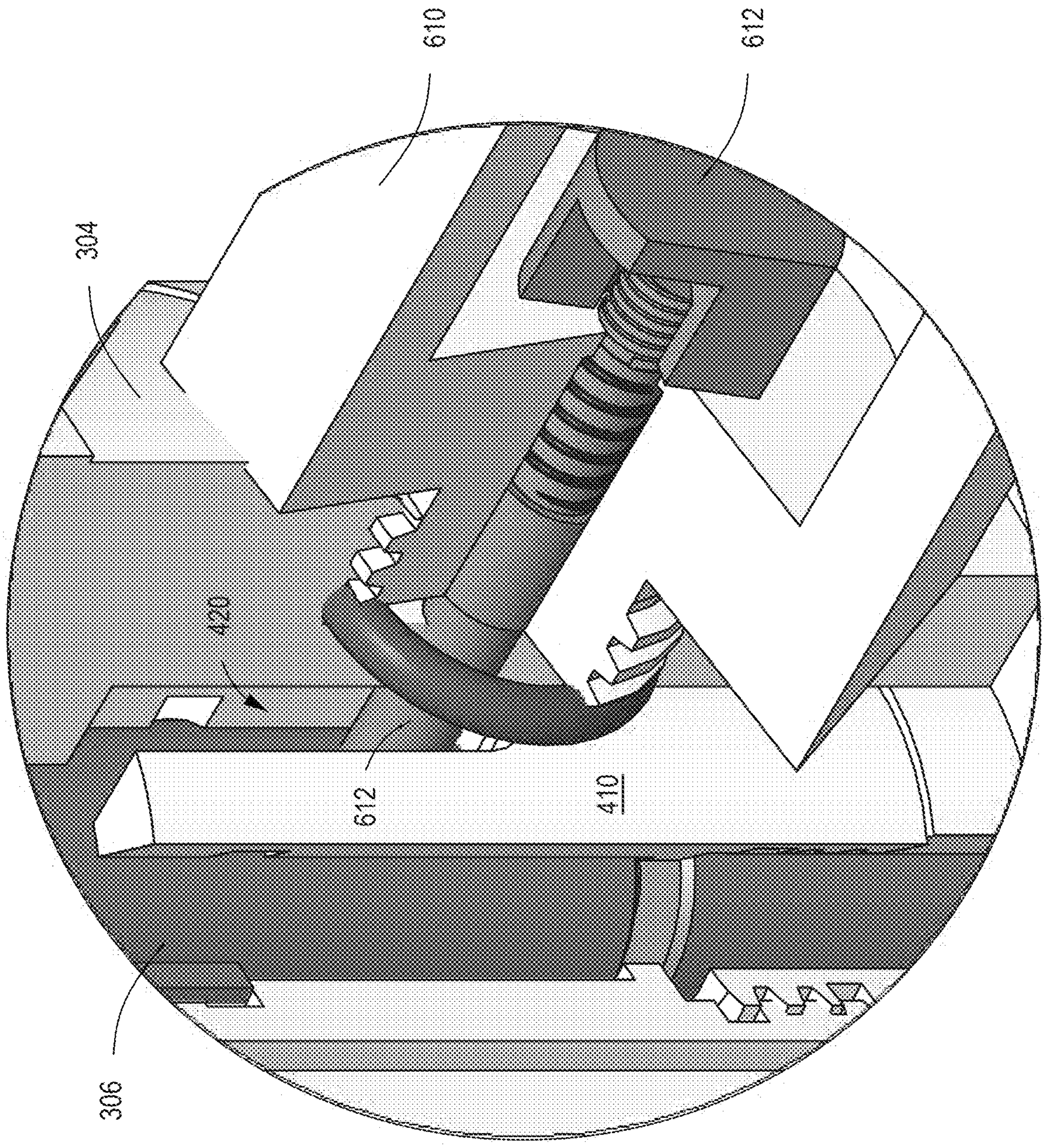
FIG. 6B illustrates a close-up perspective view of a test plug coupled to a first housing.

Referring to FIG. 6B, a test plug 610 be threadably coupled to the second housing 302. The second housing 302 has a testing aperture 312 open to the first connector 306. Box threads on the test plug 610 may threadably coupled to box threads disposed in the testing aperture 312. The test plug 610 may have a conductive pin 612 extending through the testing aperture 312. Moreover, the conductive pin 612 extending through a groove 420 disposed in the protective sleeve 408. Accordingly, the conductive pin 612 may be abutted against, e.g., in physical contact with, the first connector 306.

FIG. 7 illustrates an exploded view of components of a first housing 302 disposed relative to a junction box 104.

FIG. 8 illustrates a perspective view of a sequence for coupling a first housing 302 to a junction box 104.

Figure 9:
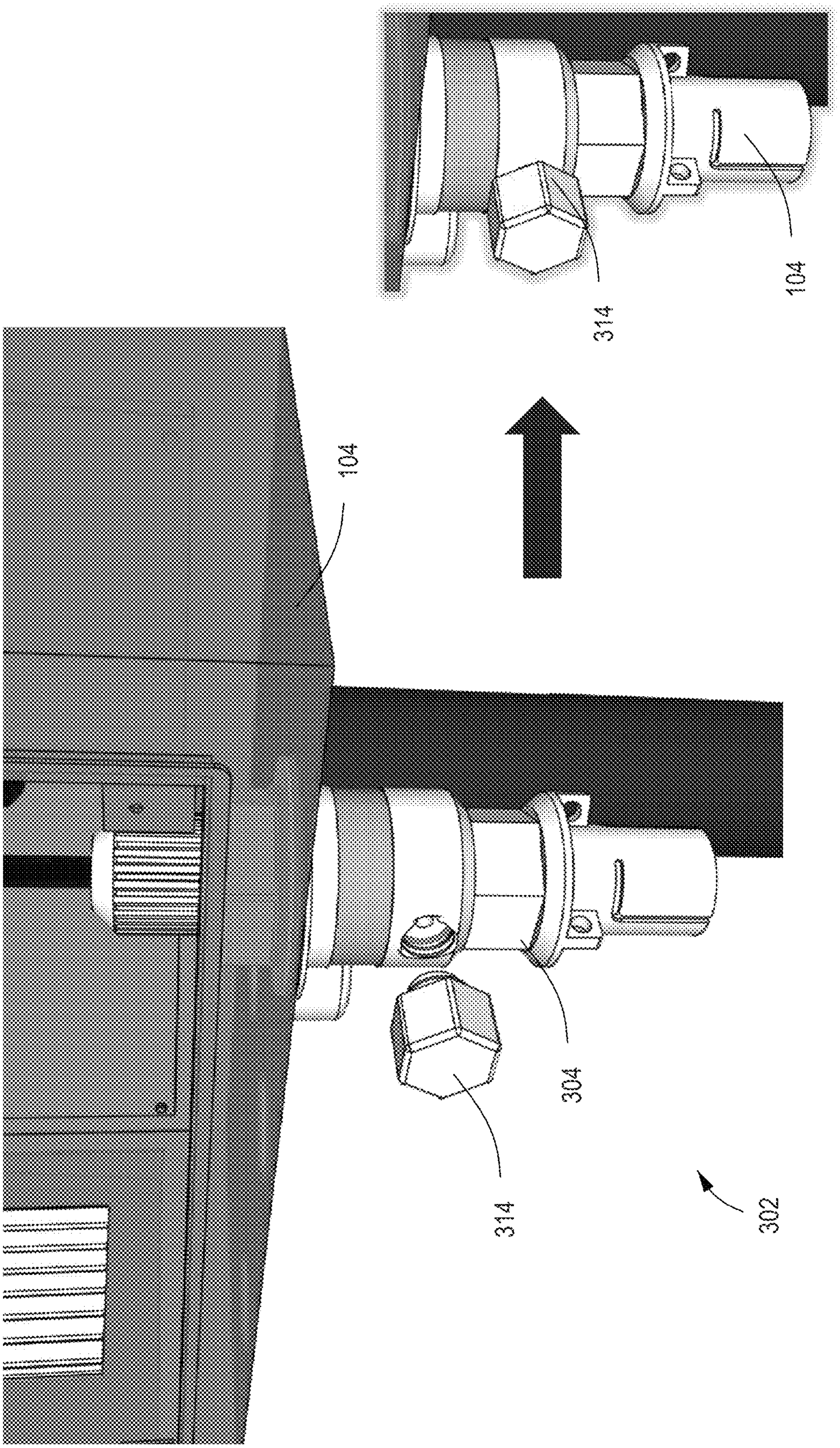
FIG. 9 illustrates a perspective view of a sequence for coupling a plug to a first locking sleeve of a first housing.

FIG. 9 illustrates a perspective view of a sequence for coupling a plug 314 to a first locking sleeve 304 of a first housing 302.

Figure 10:
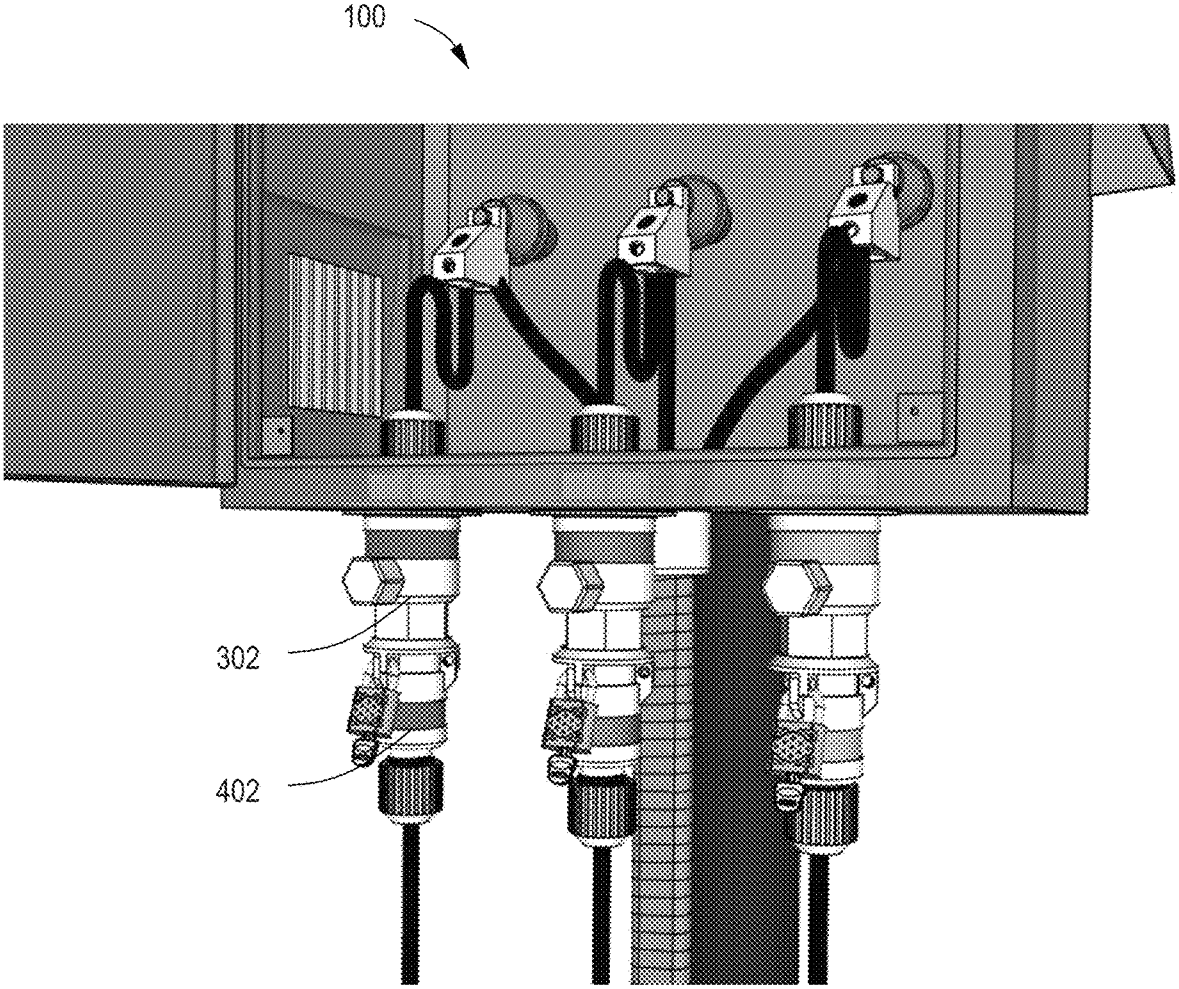
FIG. 10 illustrates a perspective view of portions of three-phase cables cable enclosed in respective cable splice assemblies.

FIG. 10 illustrates a perspective view of portions of three-phase cables terminals enclosed in respective cable splice assemblies 100.

Figure 11:
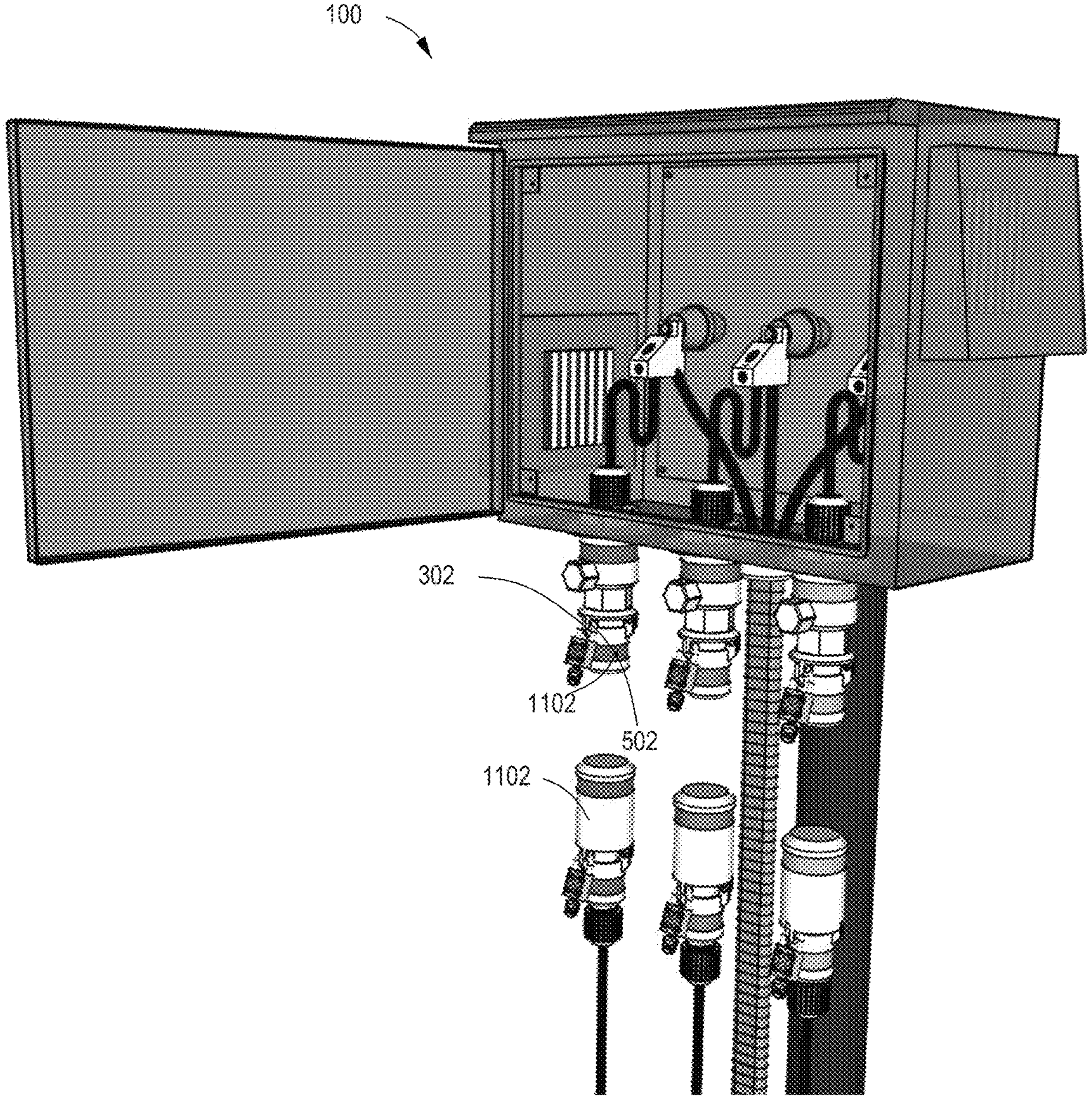
FIG. 11 illustrates a perspective view of portions of three-phase cable terminals enclosed in respective housings, wherein the housings are capped with housing caps.

FIG. 11 illustrates a perspective view of portions of three-phase cable terminals enclosed in respective housings 302, 402, wherein the housings 302, 402 are capped with respective housing caps 1102.

Each housing cap 1102 has a cap castellation 1104 that may be abutted against a housing castellation 502. Each cap castellation 1104 may have an aperture. Each housing castellation 502 may have an aperture 504 (see FIG. 4 and FIG. 5). Respective apertures may be aligned such that a portion of lock may extend through the apertures. The lock may inhibit uncoupling of the housing cap 1102 from the housings 304, 402.

What is claimed as the invention is:

1. A cable splice assembly for splicing a first electrical cable terminal, that is at least partially disposed in a junction box, to a second electrical cable terminal, the cable splice assembly comprising:

a first housing coupled to the junction box and to a portion of the first electrical cable terminal, wherein the first housing comprises a first wall; and a second housing coupled to the first housing and to a portion of the second electrical cable terminal, wherein the first housing comprises a second wall; and a testing aperture disposed in the first wall or the second wall;

a pin having a portion disposed in the testing aperture, wherein the pin is conductively coupled to the first terminal or the second terminal.

2. The cable splice assembly of claim 1, wherein the testing aperture extends towards a central axis of the either first housing or the second housing.

3. The cable splice assembly of claim 1, wherein the testing aperture extends perpendicular to a central axis of either the first housing or the second housing.

4. The cable splice assembly of claim 1, wherein the first housing has pin threads coupled to box threads disposed on the second housing.

5. The cable splice assembly of claim 1, wherein the first housing and the second housing sealably coupled.

6. The cable splice assembly of claim 1, further comprising a plug capable of extending through the testing aperture.

7. The cable splice assembly of claim 1, wherein the first housing further comprises a first locking aperture and the second housing further comprises a second locking aperture aligned with the first locking aperture.

8. The cable splice assembly of claim 1, further comprising a plug capable of covering the testing aperture.

9. The cable splice assembly of claim 1, further comprising a lock having a portion disposed through a first locking aperture of the first housing and a second aperture of the second housing.

10. The cable splice assembly of claim 1, further comprising:

a first castellation disposed on first housing; and a second castellation disposed on second housing, wherein the first locking is capable of being aligned with the second castellation to receive a lock therethrough.

11. A cable splice assembly for splicing a first electrical cable terminal, at least partially disposed in a junction box, to a second electrical cable terminal, the cable splice assembly comprising:

a first housing coupled to the junction box and to a portion of the first electrical cable terminal, wherein the first housing comprises a first wall; and a second housing coupled to the first housing and to a portion of the second electrical cable terminal, wherein the second housing comprises a second wall;

a testing aperture disposed in the first wall or the second wall;

a plug having a portion disposed in the port; and a pin having a portion disposed in the testing aperture, wherein the pin is conductively coupled to the first terminal or the second terminal.

12. The cable splice assembly of claim 11, wherein the plug and pin are concentric.

13. The cable splice assembly of claim 11, wherein the plug is removably coupled to the first wall or the second wall.

14. The cable splice assembly of claim 11, wherein the plug is capable of extending through the testing aperture.

15. The cable splice assembly of claim 11, wherein the plug is capable of covering the testing aperture.

16. A cable splice assembly for splicing a first electrical cable terminal, at least partially disposed in a junction box, to a second electrical cable terminal, the cable splice assembly comprising:

a housing capable receiving longitudinally therein the first electrical cable terminal or the second electrical cable terminal, wherein the housing comprises:

a wall; and a testing aperture disposed in the wall;

a plug having a portion disposed in the testing aperture; and a pin capable of having a portion disposed in the testing aperture, wherein the pin is conductively coupled to the first terminal or the second terminal.

17. The cable splice assembly of claim 16, wherein the plug is removably coupled to the wall.

18. The cable splice assembly of claim 16, wherein the housing is capable of being concentric with the first electrical cable terminal and the second electrical cable terminal.

19. A method of splicing a first electrical cable terminal and a second electrical cable terminal, comprising:

providing a cable splice assembly that comprises:

a first housing;

a second housing;

a testing aperture disposed in either first housing or the second housing;

a plug covering the port; and a pin;

coupling either the first housing or the second housing to a junction box;

sealably coupling the first housing to the second housing;

sealably coupling the first cable terminal to the first housing;

sealably coupling the second cable terminal to the second housing;

removing the plug from the testing aperture;

extending a portion of the pin through the testing aperture;

abutting the pin against either the first electrical cable terminal or the second electrical cable terminal.

20. The cable splice assembly of claim 19, further comprising coupling a lock to the first housing and the second housing.

* * * * *